(12) United States Patent
Shimizu

(10) Patent No.: US 6,816,868 B1
(45) Date of Patent: Nov. 9, 2004

(54) DATABASE SYSTEM

(75) Inventor: Isao Shimizu, Tokyo (JP)

(73) Assignees: Obun Insatsu Co., Ltd., Tokyo (JP); Masamichi Sugahara, Miyagi (JP)

( * ) Notice: Subject to any disclaimer, the term of this patent is extended or adjusted under 35 U.S.C. 154(b) by 396 days.

(21) Appl. No.: 09/830,672

(22) PCT Filed: Aug. 28, 2000

(86) PCT No.: PCT/JP00/05782

§ 371 (c)(1),
(2), (4) Date: Apr. 30, 2001

(87) PCT Pub. No.: WO01/16797

PCT Pub. Date: Mar. 8, 2001

(30) Foreign Application Priority Data

Aug. 31, 1999 (JP) .......................................... 11-244479

(51) Int. Cl.[7] .............................................. G06F 17/30
(52) U.S. Cl. ......................... 707/102; 707/3; 707/104.1
(58) Field of Search ................... 707/1–10, 100–104.1; 345/764, 809; 705/26, 27; 709/203, 204

(56) References Cited

U.S. PATENT DOCUMENTS

| | | | |
|---|---|---|---|
| 5,201,046 A | * | 4/1993 | Goldberg et al. ........... 707/100 |
| 5,553,218 A | * | 9/1996 | Li et al. ..................... 707/102 |
| 5,819,086 A | | 10/1998 | Kroenke |
| 6,205,447 B1 | | 3/2001 | Malloy |
| 6,408,294 B1 | * | 6/2002 | Getchius et al. ................ 707/5 |

FOREIGN PATENT DOCUMENTS

| | | |
|---|---|---|
| EP | 0 877 327 A2 | 11/1998 |
| JP | 10105495 A | 4/1998 |
| JP | 10111821 A | 4/1998 |
| WO | WO99/23585 | 5/1999 |
| WO | WO00/19345 | 4/2000 |
| WO | WO00/43850 | 7/2000 |

* cited by examiner

Primary Examiner—Jean M. Corrielus
Assistant Examiner—Joon Hwan Hwang
(74) Attorney, Agent, or Firm—Sughrue Mion, PLLC

(57) ABSTRACT

A database system that accommodates any type of phenomenon or thing, with a simple table structure and an extremely small-scale program. Category identification information of the content to be registered, item names that represent an attribute and/or a function included in the category, and attributes of data representing the substantial contents of these items (item data attributes) are registered in each data cell of a data property table (21) in units of rows, and category identification information, title names, and substantial contents associated with each item are registered in data cells of a main data table (22) in units of rows. The item names of the table (21) and the substantial contents of the table (22) correspond by means of cell numbers, and when a database management system (10) performs data input, storage, searching, and output, the various methods are generated with row-direction data of the table (21) as a message.

9 Claims, 25 Drawing Sheets

( ■ ; AREA,   □ ; UPPER-ORDER CATEGORY,   ◇ ; CATEGORY )

Fig. 3

| CATG_NO | ROOT_CATG_NO | PARENT_CATG_NO | CATG_KJ | ...... |
|---|---|---|---|---|
| 1 | 1 | 0 | ELECTRONIC BULLETIN BOARD | |
| 2 | 2 | 0 | ELECTRONIC CATALOG | |
| 3 | 3 | 0 | COMPANY INFORMATION | |
| 4 | 4 | 0 | MEMBERSHIP MANAGEMENT | |
| 5 | 5 | 0 | INFORMATION | |
| 6 | 2 | 2 | PERSONAL COMPUTER PERIPHERALS | |
| 7 | 1 | 1 | EVENTS | |
| 8 | 2 | 6 | PRINTER | |
| 9 | 1 | 7 | FIREWORKS | |
| 10 | 1 | 7 | CONCERTS | |
| 11 | 2 | 2 | ELECTRICAL COMMUNICATION TERMINAL | |
| 12 | 3 | 3 | DOMESTIC PUBLICLY TRADED COMPANIES | |
| 13 | 3 | 3 | OTHER DOMESTIC COMPANIES | |
| 14 | 2 | 2 | PERSONAL COMPUTERS | |
| 15 | 1 | 1 | PET ANIMALS | |
| 16 | 1 | 15 | DOG | |
| 17 | 2 | 6 | SCANNER | |
| 18 | 2 | 11 | GENERAL TELEPHONE APPARATUS | |
| 19 | 1 | 15 | CAT | |
| 20 | 2 | 11 | FACSIMILE | |
| 21 | 1 | 15 | DOG 1 | |
| 22 | 3 | 3 | OVERSEAS COMPANIES | |
| 23 | 2 | 2 | PUBLICATIONS | |
| 24 | 2 | 23 | GENERAL BOOKS | |
| 25 | 2 | 23 | MAGAZINES | |
| 26 | 2 | 23 | DICTIONARIES | |
| 27 | 4 | 4 | GENERAL MEMBERS | |
| 28 | 4 | 4 | SPECIAL MEMBERS | |
| 29 | 4 | 4 | CORPORATE MEMBERS | |
| 30 | 2 | 14 | DESKTOP | |
| 31 | 2 | 23 | GENERAL BOOKS 1 | |
| 32 | 2 | 23 | GENERAL BOOKS 2 | |
| 33 | 5 | 5 | NEW SERVICES STARTED | |
| 34 | 1 | 1 | HELP WANTED | |
| 35 | 3 | 3 | STOCK INFORMATION | |
| 36 | 2 | 11 | MODEM | |
| 37 | 1 | 7 | CONCERTS 1 | |
| 38 | 2 | 14 | NOTEBOOK | |
| 39 | 5 | 5 | INCREASED NUMBER OF LINES | |
| 40 | 1 | 15 | BIRD | |

Fig. 5

Category[ ] Data Property Settings (Page 1/1)

Upper-Order Category List | Tree Display

Category Name: Separate

Data Operation Authority: 0 or greater

Data Registration: yes ▶

Date/Time Registered: 99/05/17 10:52:24 AM

Input Style

Display Style

Input Guidance

| Display Sequence | No. | Item Name | Data Type |
|---|---|---|---|
| 100 | 1 | | Character ▶ |
| 110 | 3 | | Value ▶ |
| 120 | 4 | | Date ▶ |
| 130 | 5 | | Image ▶ |
| 140 | 6 | | Character ▶ |
| 150 | 7 | | Character ▶ |
| 160 | 8 | | Character ▶ |
| 170 | 9 | | Character ▶ |
| 180 | 10 | | Character ▶ |
| 190 | 11 | | Character ▶ |

Comment

HELP

NEXT

Fig. 6

| | | | | | | Search | List |
|---|---|---|---|---|---|---|---|
| Upper-Order Category List | Tree Display | | | | | | HELP |

Category [ Dog ] Data Property Settings (Page 1/1)

Category Name: Separate : Dog   Input Style: Dog_Edit   Display Style: Pet02 P1   Data Registration: yes ▶

Data Operation Authority: 0 or greater   Date/Time Registered: 99/05/17 10:52:24 AM

| Display Sequence | No. | Item Name | Data Type | Maximum Character Length | Units (e.g., kg) | Range | Size Columns | Rows | Search | List |
|---|---|---|---|---|---|---|---|---|---|---|
| 100 | 1 | Breed | Character ▶ | 64 (single-byte) ▶ | | | | | ▶ | ▶ |
| 120 | 3 | Age | Value ▶ | | years | ▶ | | | ▶ | ▶ |
| 130 | 4 | Weight | Value ▶ | | kg | ▶ | | | ▶ | ▶ |
| 140 | 5 | Height | Value ▶ | | cm | ▶ | | | ▶ | ▶ |
| 150 | 6 | Male/female | Character ▶ | 64 (single-byte) ▶ | | | | | ▶ | ▶ |
| 160 | 7 | Tricks | Character | | | | Unlimited | | ▶ | ▶ |
| 170 | 8 | Favorite food | Character ▶ | 255 (single-byte) ▶ | | | | | ▶ | ▶ |
| 180 | 9 | Pedigree | Character ▶ | 64 (single-byte) ▶ | | | | | ▶ | ▶ |
| 190 | 10 | Owner | Character ▶ | 64 (single-byte) ▶ | | | | | □ | □ |
| 101 | 11 | Photo | Image | | | | Size Columns 40 Rows 4 | | ▶ | ▶ |

Comment: ◀▒▶

Add Registered Page | Update Contents | Delete All

Fig. 7

| Upper-Order Category List | Tree Display |

Category [General Telephone Apparatus] Data Property Settings (Page 1/2)   HELP Category Name [Separate : General Tele]   Input Style [Tel_Edit02]   Data Registration [yes ▶]

Data Operation Authority [0] or greater   Display Style [Comter02 P1]   Date/Time Registered: 99/07/10  6:15:21 PM

| Display Sequence | No. | Item Name | Data Type | Maximum Character Length | Units (e.g., kg) | Range | Search | List |
|---|---|---|---|---|---|---|---|---|
| 100 | 1 | Authorization number | Character ▶ | 64 (single-byte) ▶ | | | ☑ | ☑ |
| 110 | 2 | Applicant name | Character ▶ | 64 (single-byte) ▶ | | | ☑ | ☑ |
| 120 | 3 | Authorization date | Date ▶ | Year Month Day ▶ | | ▶ | ☐ | ☑ |
| 121 | 13 | Photo | Image | | | | ☑ | ☐ |
| 130 | 4 | Application | Character ▶ | Unlimited Size Columns [40] Rows [2] | | | ☑ | ☐ |
| 140 | 5 | Applicable line | Character ▶ | 64 (single-byte) ▶ | | | ☐ | ☐ |
| 150 | 6 | Line connection method | Character ▶ | 64 (single-byte) ▶ | | | ☐ | ☐ |
| 160 | 7 | Power supply used | Character ▶ | 64 (single-byte) ▶ | | | ☐ | ☐ |
| 170 | 8 | Net control function | Character ▶ | 64 (single-byte) ▶ | | | ☐ | ☐ |
| 180 | 9 | Selection signal type | Character ▶ | 64 (single-byte) ▶ | | | ☐ | ☐ |
| 190 | 10 | Calling method | Character ▶ | 64 (single-byte) ▶ | | | ☐ | ☐ |
| 200 | 11 | DC resistance value | Value ▶ | | Ω ▶ | ▶ | ☐ | ☐ |

| Add Registered Page | Update Contents | Delete All |

Fig. 8

Category [General Telephone Apparatus] Data Property Settings (Page 2/2)

Upper-Order Category List | Tree Display

Category Name: Separate : General Tele  Input Style: Tel_Edit02  Display Style: Comter02 P1  Data Registration: yes ▶

Data Operation Authority: 0 or greater  Date/Time Registered: 99/07/10 6:15:21 PM  HELP

| Display Sequence | No. | Item Name | Data Type | Maximum Character Length | Units (e.g., kg) | Range | Search | List |
|---|---|---|---|---|---|---|---|---|
| 210 | 12 | Number of lines accomm | Value ▶ | 64 (single-byte) ▶ | Line ▶ | ▶ | ☐ | ☐ |
| 220 | 14 | Control CPU | Character ▶ | Unlimited | Size Columns 40 Rows 5 | | ☐ | ☐ |
| 230 | 15 | Main functions | Character ▶ | Unlimited | Size Columns 40 Rows 5 | | ☐ | ☐ |
| 240 | 16 | Other | Character ▶ | | | | ☐ | ☐ |
| 250 | 17 | W | Value ▶ | | mm ▶ | | ☐ | ☐ |
| 260 | 18 | D | Value ▶ | | mm ▶ | | ☐ | ☐ |
| 270 | 19 | H | Value ▶ | | mm ▶ | | ☐ | ☐ |
| 280 | 20 | Weight | Value ▶ | | Kg ▶ | | ☐ | ☐ |
| | | | Character ▶ | 64 (single-byte) | | | ☐ | ☐ |
| | | | Character ▶ | 64 (single-byte) | | | ☐ | ☐ |

Comment: ◀▓▓▶

Add Registered Page | Update Contents | Delete All

| Character ▼ |
|---|
| Character |
| Value |
| Date |
| Image |
| Plugin |
| Audio |
| E-mail |
| URL Link |
| Download |
| Password |
| Intersystem Link |

(B)

| 64(single-byte) ▼ |
|---|
| 64(single-byte) |
| 255(single-byte) |
| Unlimited |

(C)

| Or greater ▼ |
|---|
| Or greater |
| Or less |
| Not exceeding |
| ~ |
| Before |
| After |

(D)

| Year Month Day ▼ |
|---|
| Year Month Day |
| Year Month Day Hour Minute |
| Time Only |

Fig. 1 2

Main Data List | Table Format Registration | HELP

Card-Type Data Registration/Updating/Deletion(Page 1/1) (Category : Dog)

Title Name: Amber    Data No.148
Code: 1235    Registered date 99/05/17 10:52:24 AM Item | Data
--- | ---
Breed | English Springer
Age | 2 Years
Weight | 18.0 kg
Height | 35.0 cm
Male/female | Female
Tricks | Barks to music / Stands up and walks on hind legs (about 3m) / Acts as guard dog in unattended house / Plays with a ball
Favorite food | Ham and sausage, bread, rice gruel
Pedigree | Pedigree No. 123456
Owner | Isao Shimizu
Photo | Full body photograph available Register    Register Image
Update This Page
Delete Entire Page

Fig. 13

Main Data List | Table Format Registration | HELP

Card-Type Data Registration/Updating/Deletion(Page 1/2) (Category : General Telephone Apparatus)

Title Name [T-3360 Telephone Apparatus] Data No. 287

Code [1564]   Registered date 99/07/10  6:15:21 PM

Item  Data

Authorization number: P91-0016-0
Applicant name: Nippon Telegraph and Telephon Corporation
Authorization date: 1999 Year 6 Month 1 Day
Photo: Full view photograph available    [Register Image]
Application: This apparatus is a general-purpose telephone apparatus that is used when connected to a telephone line.
Applicable line: Telephone line
Line connection method: Communication connector
Power supply used: Station Power, 100VAC, battery
Net control function: OBUN NEW GOD
Selection signal type: DP (10/20 p p s) , PB (switchable)
Calling method: Tone ringer (3 steps of loudness)

[Update This Page]  [Delete Entire Page]

Fig. 14

| Main Data List | | Table Format Registration | | HELP |

Card-Type Data Registration/Updating/Deletion (Page 2/2) (Category : General Telephone Apparatus)

Title Name [T-3360 Telephone Apparatus] Data No. 287

Code [1564]  Registered date 99/07/10  6:15:21 PM

Item        Data
DC resistance value  [276]  Ω
Number of lines accommodated  [1]  Lines
Control CPU  [300]
Main functions  [◀▮▶]
Other  [◀▮▶]
W  [167]  mm
D  [210]  mm
H  [67]  mm
Weight  [0.9]  Kg

[Register]  [Update This Page]  [Delete Entire Page]

Fig. 15

MDT (MAIN DATA TABLE)

| No. | CATG_NO | TITLE NAME | CODE | DATA CELL(1) | DATA CELL(2) | DATA CELL(3) | DATA CELL(4) | DATA CELL(5) | DATA CELL(6) | DATA CELL(7) | ... |
|---|---|---|---|---|---|---|---|---|---|---|---|
| 1 | 8 | LPX-800 | 332 | E P Corporation | SEMICONDUCTOR SCAN+...... | 1200 | 8 (A4) | IEEI1284 STANDARD BIDIRECTIONAL | EPC/PAGE | PAPER FEED TRAY LOWER CASSETTE | ... |
| 2 | 9 | SUMIDAGAWA FIREWORKS DISPLAY | 155 | 1999/07/25 | 19:10 | 20:30 | DOWNSTREAM OF SAKURABASHI TO ...... | 20000 | IMAGE FILE No. 24 | THIS IVENT STA-RTED IN 1977 AT RYOGOKU. ... | ... |
| 148 | 16 | AMBER | 235 | ENGLISH SPRINGER | 2 | 18.0 | 35.0 | FEMALE | BARKS TO MUSIC... | HAM AND SAUSAGE, BREAD, RICE GRUEL | ... |
| 287 | 18 | T-3360 TELEPHONE APPARATUS | 1564 | P91-0016-0 | NIPPON TELEGRAPH AND TELEPHON CORPORATION | 1999/06/01 | IMAGE FILE No. 43 | THIS APPARATUS IS A GENERAL PURPOSE, ... | TELEPHONE LINE | COMMUNICATION CONNECTOR | ... |
| 2093 | 21 | KENKEN | 82224 | BEAGLE | 5 | 27.6 | 35.3 | MALE | DIGGING HOLES | APPLES, RIBS | ... |
| 2094 | 26 | DIGITAL BIG DICTIONARY | 82250 | 1999/03/10 | NIKKEI BP CORPORATION | NIKKEI BP PUBLISHING | FIRST EDITION FIRST PRINTING | B5 SIZE | 1138 | 5000 | ... |

Fig. 16

Upper-Oder Category List

| Hierarchy Level | Upper-Oder Category | Lower-Oder Class | Individual Data | Description |
|---|---|---|---|---|
| ☐ | Personal Computer Peripherals | YES | View List Data | Loaded with catalog information for printers, scanners, etc. |
| ☐☐ | Events | YES | View List Data | Information about events to be held around the country. |
| ☐☐ | Electrical Communucation Terminal | YES | View List Data | Information about general telephone apparatuses, facsimil… |
| ☐☐ | Company Information | YES | View List Data | Information such as stock information about domestic… |
| ☐☐ | Personal Computers | YES | View List Data | Detailed information about the latest models from various |
| ☐☐ | Pet Animals | YES | View List Data | Guide to cute pets. |
| ☐☐ | Publications | YES | View List Data | Guide to newly appearing publications. |
| ☐☐ | Membership Management | YES | | |
| ☐☐ | Information | YES | View Individual Data | Notices from the administrator of this database system. |
| ☐☐ | Help Wanted | YES | View List Data | Help wanted information by position type and region. |
| ☐☐ | Automotive Parts | YES | View List Data | Automotive parts such as CLIP and PROTECTOR. |
| ☐☐ | Used Auto Sales | YES | View List Data | Recommended recycled autos. |
| ☐☐ | Game Software | YES | View List Data | Latest information, including planned releases. |
| ☐☐ | Audio Products | YES | View List Data | Systems and related products from various manufacturers. |
| ☐☐ | Travel | YES | View List Data | Domestic and overseas package tour information. |
| ☐☐ | Real Estate | YES | View List Data | Standalones, condos, auction information by region. |
| ☐☐ | Furniture | YES | View List Data | Information about traditional and modern furniture from… |
| ☐☐ | Movie/Theatre | YES | View List Data | Information about past classics and currently popular films… |
| ☐ | Handcrafts | YES | View List Data | Information about clubs and individual works. |

HELP

Page 1/20

Fig. 17

[Return to Upper-Category List]    HELP

Tree Display (Category : Pet Animals)

☐ View Pet Animals list data
◇ View dog list data
- View mixed breed list data
- View English Springer list data
- View Chihuahua list data
- View hunting dog list data
 • View Pointer list data
 • View Beagle list data
- View Akita dog list data
◇ View cat list data
- View Tortoise-shell cat list data
- View Tabby cat list data
- View Black cat list data
- View foreign cat list data
 • View Siamese cat list data
 • View Persian cat list data
 • View Manx cat list data
◇ View bird list data
- View Western bird list data
- View Japanese bird list data
◇ View rabbit list data Page 1/5    Next Page

Fig. 19

| Upper-Oder Category List | Tree Display | | | | | | | | | HELP |
|---|---|---|---|---|---|---|---|---|---|---|

Category "Dog" Data List

| Title Name | Code | Breed | Age | Weight | Height | Male/Female | Tricks | Favorite Food | Owner | Photo |
|---|---|---|---|---|---|---|---|---|---|---|
| Taro | 104726 | Akita dog | 5 Years | 48.5 Kg | 56.5 cm | Male | New Window | New Window | Ichiro Nakamura | New Window |
| Amber | 001235 | English Springer | 2 Years | 18.0 Kg | 35.0 cm | Female | New Window | New Window | Isao Shimizu | New Window |
| Peach | 001765 | Chihuahua | 3 Years | 4.9 Kg | 20.7 cm | Female | New Window | New Window | Hideko Tanaka | New Window |
| Paul | 040021 | Mixed breed | 6 Years | 35.3 Kg | 41.6 cm | Male | New Window | New Window | Jiro Suzuki | New Window |
| Kojiro | 005487 | Mixed breed | 2 Years | 18.0 Kg | 35.0 cm | Female | New Window | New Window | Hiroshi Nishimura | New Window |
| John | 280034 | Pointer | 4 Years | 35.0 Kg | 47.5 cm | Male | New Window | New Window | Yukio Terada | New Window |
| Pal | 113678 | Mixed breed | 6 Years | 34.8 Kg | 32.7 cm | Female | New Window | New Window | Kazuo Kikuchi | New Window |
| Ron | 011147 | Mixed breed | 8 Years | 37.0 Kg | 35.0 cm | Male | New Window | New Window | Bill Smith | New Window |
| Yoko | 030475 | Mixed breed | 3 Years | 22.8 Kg | 29.9 cm | Female | New Window | New Window | Hiroko Sakurai | New Window |
| Kenken | 082224 | Beagle | 5 Years | 27.6 Kg | 35.3 cm | Male | New Window | New Window | Takashi Yoshida | New Window |
| Ring | 000422 | Chihuahua | 8 Years | 17.1 Kg | 21.8 cm | Male | New Window | New Window | Keiko Akita | New Window |
| Ran | 475217 | English Springer | 10 Years | 20.8 Kg | 42.4 cm | Male | New Window | New Window | Takeo Itoi | New Window |
| Pauly | 386977 | Mixed breed | 15 Years | 34.1 Kg | 34.5 cm | Male | New Window | New Window | Hitoshi Kimura | New Window |
| Shiro | 447359 | Mixed breed | 3 Years | 28.9 Kg | 29.1 cm | Male | New Window | New Window | Akio Okabe | New Window |
| Musashi | 320842 | Akita dog | 16 Years | 50.7 Kg | 55.1 cm | Male | New Window | New Window | Ryuichi Ishida | New Window |
| Mark | 155463 | Beagle | 10 Years | 26.9 Kg | 35.3 cm | Male | New Window | New Window | Fumiko Kitano | New Window |
| Kotaro | 175643 | Pointer | 9 Years | 32.8 Kg | 47.0 cm | Male | New Window | New Window | Toshio Ozawa | New Window |
| Kuro | 124381 | Mixed breed | 7 Years | 19.0 Kg | 27.3 cm | Male | New Window | New Window | Yayoi Hanada | New Window |
| Magic | 222559 | Beagle | 2 Years | 18.2 Kg | 22.2 cm | Male | New Window | New Window | Hajime Urata | New Window |

Page 1/2                                   Next Page

Fig. 21

Search Data Content Display (Page 1/1)

(Upper-order category: Pet Animals, category: Dog)

Title name : Amber
Breed : English Springer
Age : 2 years
Weight : 18 Kg
Height : 35 cm
Male/Female : Female
Tricks : Barks to music
        Stands up and walks on hind legs
        Acts as guard dog in unattended house
        Play with a ball
Favorite food : Ham and sausage, bread, rice gruel
Pedigree :
Owner : Isao Shimizu Upper-Oder Category List | Tree Display | Data List | HELP

Fig. 24

Data search condition settings (search data : category "dog")

| Field | Value | | |
|---|---|---|---|
| Title name | | | |
| Code | | | |
| 1 Breed | | | |
| 3 Age | 2 years or greater | 4 years | or less |
| 4 Weight | 15 Kg or greater | 35 Kg | or less |
| 5 Height | cm or greater | cm | or less |
| 6 Male/female | | | |
| 7 Tricks | | | |
| 8 Favorite food | | | |
| 9 Pedigree | | | |
| 10 Owner | | | |

Search

Fig. 25

Data List Created by Conditional Search (Search conditions : Age>=2years Age<=4years Weight>=15Kg Weight<=35Kg)

| Title Name | Code | Breed | Age | Weight | Height | Male/Female | Tricks | Favorite Food | Owner | Photo |
|---|---|---|---|---|---|---|---|---|---|---|
| Amber | 001235 | English Springer | 2 Years | 18.0 Kg | 35.0 cm | Female | | | | |
| Kojiro | 005487 | Mixed breed | 2 Years | 18.0 Kg | 35.0 cm | Female | New Window | New Window | Isao Shimizu | New Window |
| John | 280034 | Pointer | 4 Years | 35.0 Kg | 47.5 cm | Male | New Window | New Window | Hiroshi Nishimura | New Window |
| Yoko | 030475 | Mixed breed | 3 Years | 22.8 Kg | 29.9 cm | Female | New Window | New Window | Yukio Terada | New Window |
| Shiro | 447359 | Mixed breed | 3 Years | 28.9 Kg | 29.1 cm | Male | New Window | New Window | Hiroko Sakurai | New Window |
| Magic | 222559 | Beagle | 2 Years | 18.2 Kg | 22.2 cm | Male | New Window | New Window | Akio Okabe | New Window |
| | | | | | | | | | Hajime Urata | |

HELP

Page 1/1

DATABASE SYSTEM

TECHNICAL FIELD

The present invention relates to a database system into which information is stored as data made up of category names, title names, and the substantial contents, and more particularly to a system into which information belonging to all categories is stored in an extremely simple table structure and managed by small-scale software, which can be applied as an online database enabling storage and viewing from a client.

BACKGROUND ART

With widespread use being made of information devices such as personal computers and a fleshing out of online services via networks such as the Internet, the last few years have seen a dramatic increase in the number and variety of databases available.

In the past, database models have included network, hierarchal, relational, and object-oriented types, with the relational database (hereinafter referred to as the RDB) being the most widely used at present, and the object-oriented database (hereinafter referred to as the OODB), formed by introducing object orientation into a database system, being used as the main method for software development, the development and implementation of which are being actively pursued.

The implementation of object relational databases (hereinafter referred to as the ORDB), formed by introducing objection orientation into the RDB, is also being actively pursued.

The RDB, as the term is used herein, refers to representation of data by tables made up of rows and columns and the relationships between each table, the table representation of data facilitating an understanding of the data model structure, making the design thereof relatively simple.

In the RDB, normal forms are used to reduce data redundancy (that is, reduce the duplication of data) and to simplify lookup and updating, by using a table structure free from such waste. In the past, several standard normal forms have been proposed (the Codd first to third normal form, the Boyce/Codd extended third normal form, and the fourth normal form by R. Fagin and so on), and it is possible to obtain the most efficient table structure based on these standards.

Additionally, SQL (Structured Query Language) has become the standard access language, this having the advantage of enabling extraction of data without coding a procedure via an engine that interprets SQL statements.

On the other hand, in the OODB, objects, which encompass data and the associated procedures (methods), are the subject of management, with the program being coded for the exchange of instructional commands and data (messages) between objects.

Objects of one and the same type are grouped into a class (abstractly defined in terms of functions and attributes common to the objects), with an upper-order class method being inherited by a lower-order class.

In the OODB, there is a large number of data structure types, and by encapsulating the data and methods as noted above it is possible to achieve an operating environment in which the data is treated directly in the same easy-to-understand manner as would real objects, this special feature being that it is now possible to store not only characters and values, but also to store images and sounds. Object-oriented languages include such languages as C++, Smalltalk, and Java.

In the RDB, although the table structure is designed in accordance with conforming to the above-noted standard of normal forms, these standards are merely a system of logic, with actual tasks being performed sequentially while graphing a large number of individual file groups, thereby rendering the design of a table structure extremely complex and troublesome, and requiring the expenditure of a great amount of time and labor.

In a database handling a wide range of information, there is an extremely large number of table groups, and it is necessary to manage each table group individually. Additionally, in the operating process, if there is a change in an item or the like of one table, it is often necessary to make a change to related tables and programs, the resulting editing task also, as noted-above, being extremely difficult.

In the case of the OODB, because data and methods with regard to individual stored information are encapsulated in objects, in the case, for example, of a change made to items or data in a company employee database, it is necessary to open the object of each employee and make successive changes, and when this is associated with a method, it is necessary to do an in-depth study of whether an inheriting class would be influenced, the result usually being that it is necessary to perform more complex and difficult re-editing of the program than would have been involved with the RDB.

Stated differently, although the OODB is directed at achieving a user interface for efficient operation, and provides efficient programming at the point at which a method is inherited, it requires a high level of experience with regard to storage and management of individual objects, and programming of messages, and when a large amount of data is involved, the amount of work required for maintenance of the OODB becomes much greater than the work required by the RDB.

With regard to the ORDB, which is basically a hybrid of the RDB and the OODB, because its configuration is more complex, it is accompanied by the same problems as the RDB or the OODB.

Accordingly, it is an object of the present invention to provide a highly functional database, which has only an extremely simplified table structure and handles the storage of any category of information, enabling efficient execution of the essential database functions of entry, storage, retrieval, and output of data using small-scale software, and further enabling the implementation of a database system providing extreme flexibility and simplicity in making changes to an item associated with stored information, solving the above-described problems associated with the RDB and the OODB, and providing economical implementation and operation.

A database system according to the present invention enables free interactive storage of information from a client via a communication line such as the Internet, without the intervention of a programmer, and further provides the same level of user interface convenience as would be provided by the OODB.

DISCLOSURE OF INVENTION

The first invention is a database system, while managing category names, which are abstract contents of registered information (phenomena or things), and the hierarchy thereof by a data dictionary file, registers category name, individual title name, and substantial contents of each piece of information being registered, wherein the above-noted system comprising a first table and a second table, which are formed by data cells, and in the above-noted first table, category identification information given by the above-noted data dictionary file is stored in a data cell of a specific column, and names of items which represent an attribute and/or a function associated with the category and attributes of data representing the substantial contents associated with the above-noted items (hereinafter referred to as item data attributes) are stored in other cells, each belonging to a row in which the above-noted category identification information is stored, and in the above-noted second table, category identification information and a title name are stored in each cell of two specific columns, the substantial contents associated with each item name being stored in other data cells, each belonging to a row in which category identification information and title names are stored, in the same sequence with regard to item names as the row-direction sequence of data cells into which are stored item names and item data attributes in the above-noted first table, and each method for input, storage, searching, and output of data associated with registered information being generated based on data stored in the above-noted first table.

In this first invention, data of registered information belonging to all categories is managed using two tables having a simple structure.

In the first table, category identification information and "item names and item data attributes" associated with that category are stored into each data cell in units of rows, and in the second table category identification information, title names, and substantial contents associated with each of the item names of the information are stored into each data cell in units of rows, both of the stored data being associated by the category identification information, and the "item names and item data attributes" and "substantial contents associated with the each item name" being associated by the item names, in the row direction sequence of each data cell.

The first table is a virtualization of the "substantial contents associated with each item name" of the second table, in the data format of "item names and item data attributes," and based on this virtual nature, it is possible to store and manage data of registered information belonging to all categories in a single second table.

Additionally, based on the properties of the "item data attributes," it is possible to generate each method for the execution of each function (i.e. input, storage, searching, and output) which is indispensable for the database system by merely providing a single process control program to the each function.

That is, in contrast to a database system of the past, in which the configuration was one having a large number of tables related in a complex manner, with separate read/write programs corresponding to each control program for executing each of the above-noted functions, or various joint programs which take into consideration the inter-table relationships, thereby requiring a very large program, with the present invention it is possible to implement the same type of database system with an extremely simplified table structure and a small program only.

Seen in terms of operation, the above-noted first invention enables the configuration of the following second invention.

The second invention, comprising: a first storage means into which is stored a first registration screen onto which are disposed an input field for a category name, which is an abstract concept of handled information, an input field for each item name representing an attribute and/or a function associated with the above-noted category, and an input field for defining item data attributes for each item associated with the above-noted item names; a first display means for reading out and displaying a first registration screen of the above-noted first storage means; a first table formed by data cells; a first registration means, which uses data cells of a specific column of the above-noted first table as a storage area for category identification information given by the above-noted data dictionary file and assigns each data cell of the other column as a storage area for item names and item data attributes, and which, based on input into the above-noted each input field of the above-noted first registration screen, registers the above-noted category identification information, item names, and item data attributes in units of rows; a second display means for displaying a second registration screen, which generates a display method based on row-direction data associated with the above-noted category name of the above-noted first table, and on which is disposed an input field for a title name associated with the above-noted registered information, a display field for display of each item name, and an input field for substantial contents associated with each item name; a second table formed by data cells; a second registration means, which uses each data cell of two specific columns of the above-noted second table as storage areas for category identification information and title names and assigns each data cell of other columns as a storage area for substantial contents associated with the above-noted item names, and which, based on input into each input field in the above-noted second registration screen, stores category identification information, title name, and substantial contents associated with each item name in units of rows, this storage being performed so that row-direction sequence of the above-noted each data cell into which the above-noted substantial contents associated with each item name is stored is the same with regard to item names as a row-direction sequence of each data cell in the above-noted first table, into which are stored item names and item data attributes; a data output means, which, in a case in which an inquiry is made with various conditions, based on data registered in the above-noted first table associated from the above-noted data dictionary file, generates an access method for the above-noted second table and an output method for registered data obtained by that access method, these methods causing output of registered data in response to the above-noted inquiry.

In the second invention, the first storage means and the first display means, by displaying the first registration screen, which corresponds to a guidance screen, cause input of the category name, the item names, and item data attributes for each of the item names.

The first registration means, based on the input from the first registration screen, causes storage of input data in units of rows into each data cell of the first table, and virtualizes the "substantial contents associated with each item name" of the second table, in the data format of "item names and item data attributes."

The second display means displays a second registration screen, which corresponds to a guidance screen for the purpose of inputting the title name, item names, and substantial contents for each item name of information to be registered. In this case, the second display means, based on the table configured with data that virtualizes the first table, can generate a display method for the second registration screen from the row-direction data associated with that category identification information.

Data registered in the first table, therefore, serves the role of defining the display conditions for the second registration screen by the second display means.

The second registration means, based on input to the second registration screen, causes storage into each data cell of the second table of the above-noted category identification information and the input data, in units of rows.

The correspondence between the first table registered data and the second table registered data is set as described with regard to the first invention.

Therefore, the data registered in the first table serves the role of defining for the second registration means the conditions for storage of substantial contents for each individual item name associated with registered information.

The data output means receives an inquiry directed at registered information in the database system.

The inquiry conditions include various conditions, such as searching using a category name or title name as a key, searching using substantial contents associated with an item name as a key, and searching with further narrowing of the scope of substantial contents, i.e., registered data of the first table with association to a data dictionary file responsive to the searching conditions being determined, this registered data being used to generate an access method for the second table, and in the case in which the recorded data of interest is to be output, an output method is generated based on the data registered in the first table.

Data registered in the first table, therefore, serves the role of defining searching conditions and outputting conditions for the data output means.

As described above, the second invention performs registration of data into the first table and into the second table, while providing the first registration screen and the second registration screen as guidance screens, enabling management (entry, storage, searching, and output) of data using these two tables, this being made possible by the above-noted virtual nature of the first table. This virtual nature functions effectively as well in the generation of the second registration screen.

Stated differently, in contrast to a database of the past, in which in the case in which it was necessary to register a new category, a programmer performed design of a complex table structure and generation of a very large program, according to the present invention, a category name, item names, and item data attributes for each item name are input beforehand, following guidance, after which a simple procedure of following guidance in registering a title name, item names, and substantial contents for each item name is performed, with subsequent individual instructions with regard to entry, storage, searching and output, being handled as if a program were being automatically developed and driven in real time, thereby achieving what could be called a "virtual object-oriented" database system.

In the above-noted first and the second inventions, by providing a data type as a defined item of data attributes, it is possible to execute the above-noted functions of entry, storage, searching and output, and it is further desirable to provide data size as an additional attribute.

In the case in which the data size is not defined, there are many cases in which there is a difference between the amounts of data in the substantial contents for each item name of data to be registered into the second table, and if the data cell capacity is set to the maximum value thereof, a large amount of memory capacity is wasted.

Given the above, if the data size is defined as noted above, and it is made possible to vary the setting of the required capacity for each data cell in the second table, it is possible to solve this problem.

For one and the same category, it can be known empirically that the amount of data for the substantial contents of each item name is almost the same.

In addition to the above-noted data type and data size, if it is made possible to specify units and a range, it is possible to properly represent any attribute or function associated with each item of each phenomenon or event existing in the natural world, thereby not only simplifying the registration process, but also broadening the scope of content that can be registered.

Next, if a selection menu is provided for the above-noted data types for character, value, date, image, and audio, it is possible to comprehensively cover the representations of substantial contents for each item name.

In addition to these basic data types, if a selection menu is provided for independent data types for data obtained by linking to another application and/or to another system, it is possible to freely capture and register various data existing outside the system, enabling use as a data warehouse and configuration of a distributed database.

In the second invention, although the capacity of the data cells of the second table, as noted above, can be made variably settable based on data attributes defined by the first table, in the case in which the type of the substantial contents associated with an item name is input as image or audio and so on, the amount of data is much greater than the case of character or date data types.

On the other hand, because of the system characteristics, there could be a limitation to the capacity of a data cell in the second table, and from the standpoint of data management as well, it is not desirable to have a great difference in capacity between individual data cells of a table.

Given the above, in such cases, if the substantial contents data is stored in a separately provided large-capacity second storage means, and only the addresses of the data stored in the second storage means are stored in the data cells of the second table, it is possible to solve the above-noted problem.

In the second invention, if the first storage means stores the first registration screen provided with input fields in display sequence corresponding to the input fields for input of each item name, and the first registration means adds each input display sequence to the item data attributes corresponding to each item name, storing this in each data cell of the first table, and the data output means generates an output method, on which the display sequence for the substantial contents associated with each item name is set, based on the display sequence associated with the above-noted input, it is possible to arbitrarily set the display sequence for substantial contents associated with the item names, so that when displaying the information resulting from a search, it is not only possible to perform uniform registered information output, but also to perform output with a display screen layout that is suitable to the category.

The third invention relates to a configuration in which the second invention is applied as an online database system.

In this invention, in response to a connection request sent via a network from a client, a circuit connection is made with the client, and in response to a client-side registration request, the above-noted first registration screen generated by the above-noted first display means is provided to the client-side, and based on transmission of input data to the above-noted first registration screen by the client-side, the input data is registered into the above-noted first table, and based on the above-noted registered data associated with the above-noted category identification information of the above-noted first table, the above-noted second registration screen generated by the above-noted second display means is provided to the client-side, and based on transmission of input data to the above-noted second registration screen by the client-side, the input data is registered into the above-noted second table, and, based on an inquiry from a client-side, various inquiry screens prepared beforehand are provided to the client-side, and in response to inquiry condition input to the screen, the above-noted data output means provide the registered data of the above-noted second table to the client-side.

In the above-noted case, in contrast to an online database of the past, which only had viewing and searching functions via a network, this invention makes it possible to perform database registration of information of any category extremely simply, while receiving online guidance.

BRIEF DESCRIPTION OF DRAWINGS

FIG. 3 is a drawing showing an example of the configuration of a category level management table (CLMT).

FIG. 5 is a drawing showing a DP setting screen initially provided, based on DP setting screen data.

FIG. 6 is a drawing showing a DP setting screen input for a category name "Dog."

FIG. 7 is a drawing showing a DP setting screen (first page) input for a category name "General Telephone Apparatus."

FIG. 8 is a drawing showing a DP setting screen (second page) for the category name "General Telephone Apparatus."

FIG. 9(A) is a drawing showing a pull-down menu of data types for an input field in a DP setting screen, FIG. 9(B) is a drawing showing a pull-down menu of the maximum character length for an input field, FIG. 9(C) is a drawing showing a pull-down menu for the range associated with a input, and FIG. 9 (D) is shows a pull-down menu displayed when the date data type is selected.

FIG. 12 is a drawing showing the registration, update, and deletion screen for data having the category name "Dog."

FIG. 13 is a drawing showing the registration, update, and deletion screen (first page) for data having the category name "General Telephone Apparatus."

FIG. 14 is a drawing showing the registration, update, and deletion screen (second page) for data having the category name "General Telephone Apparatus."

FIG. 15 is a drawing showing a schematic representation of an example of the configuration of a main data table (MDT).

FIG. 16 is a drawing showing a screen with a list display of upper-order categories.

FIG. 17 is a drawing showing a screen display of a tree representation associated with the upper-order category of Pet Animals.

FIG. 19 is a drawing showing a screen with a list of data of the category "Dog."

FIG. 21 is a drawing showing the retrieved content screen (search results screen) from a search on the category name "Dog" and the title name "Amber."

FIG. 24 is a drawing showing a conditions setting screen for a data search for the category name "Dog."

FIG. 25 is a drawing showing a list display screen obtained from a conditional search.

BEST MODE FOR CARRYING OUT THE INVENTION

An optimum embodiment of a database system (hereinafter referred to as the DBS) according to the present invention is described below, with reference made to accompanying drawings.

Figure 1:
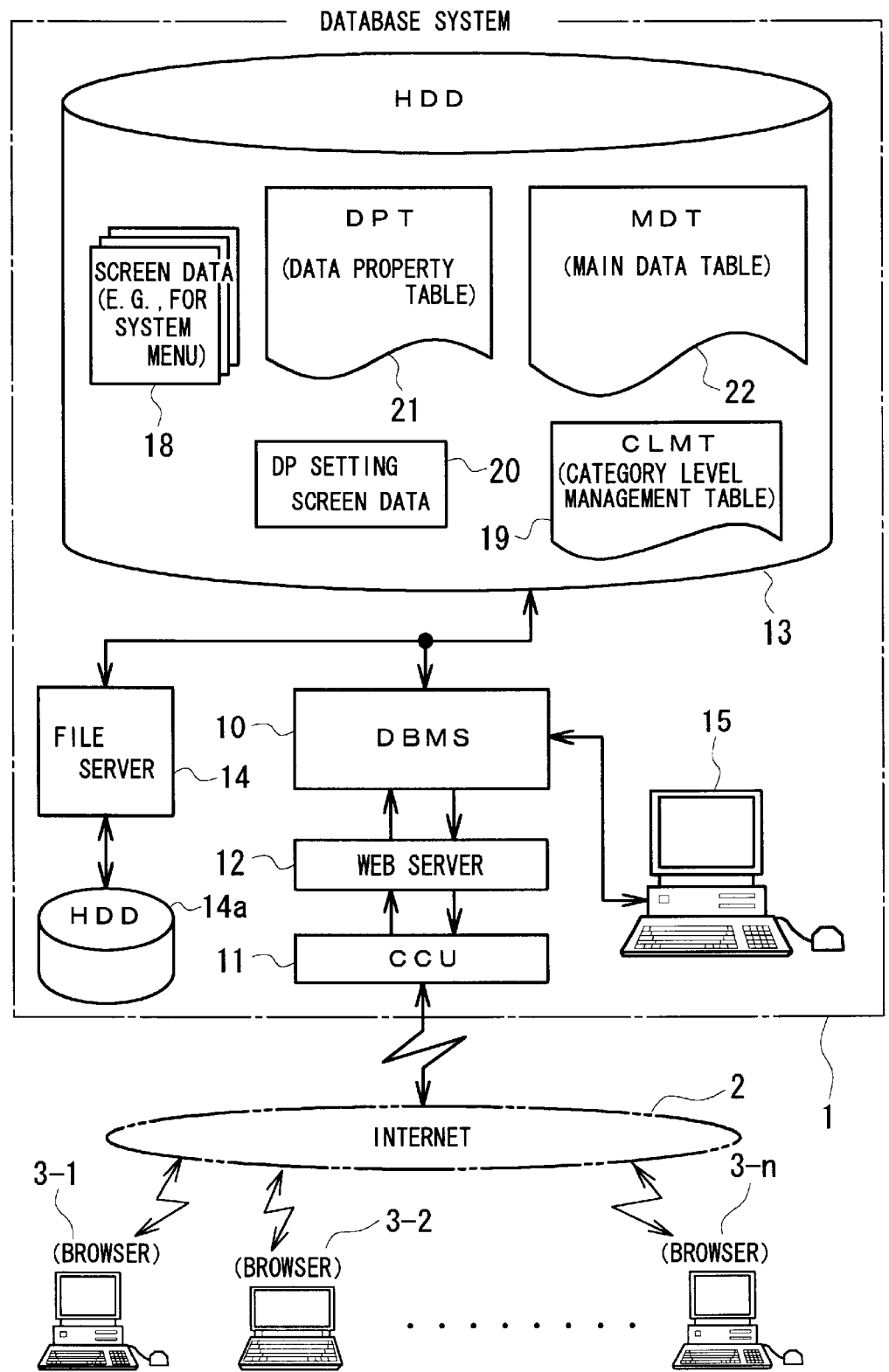
FIG. 1 is a system configuration diagram showing an online database system (DBS) to which the present invention has been applied.

First, FIG. 1 shows a system configuration diagram of an online DBS to which the present invention is applied.

In this drawing, the reference numeral 1 denotes the DBS, 2 is the Internet, and 3-1 to n are clients (terminals such as personal computers) connected to the Internet 2 via modems and web browsers.

In this case, the DBS 1, similar to the case of a conventional DBS, has a database management system (hereinafter referred to as the DBMS) 10 connected to the Internet 2 via a communication control unit 11 such as a router and a web server 12, the DBMS 10 being connected to a hard disk drive (hereinafter referred to as the HDD) 13 for data storage and a file server 14, and to a personal computer 15 provided for management.

The DBS 1 has an HDD 13, into which are stored various screen data 18 for system function menus and the like, a category level management table (hereinafter referred to as the CLMT) 19 corresponding to the data dictionary file of a conventional database system, data property (hereinafter referred to as DP) setting screen data 20, a DP table (hereinafter referred to as the DPT) 21, and a main data table (hereinafter referred to as the MDT) 22, and enables data registration into the HDD 13, as well as viewing and searching of this data online from the clients 3-1 to n.

A particular feature of this system is that the processing of registered data is handling by the two tables, the DPT 21 and the MDT 22, though the system deals with data of registered information (phenomena or things) belonging to every category, and that the management and maintenance of registered data is performed by the DBMS 10, which is extremely simplified software, this representing a unique concept entirely different from a DBS of the past.

To demonstrate the efficiency of these particular features, a conceptual description will first be provided below with regard to the handling of categories in the DBS 1. Additionally, data registration (DP setting registration and main data registration), data viewing (searching and output) and modification (updating and deleting), and category item addition and deletion will be described in sequence, with references being made to flowcharts and various display screens.

1. Handling of Categories

Figure 2:
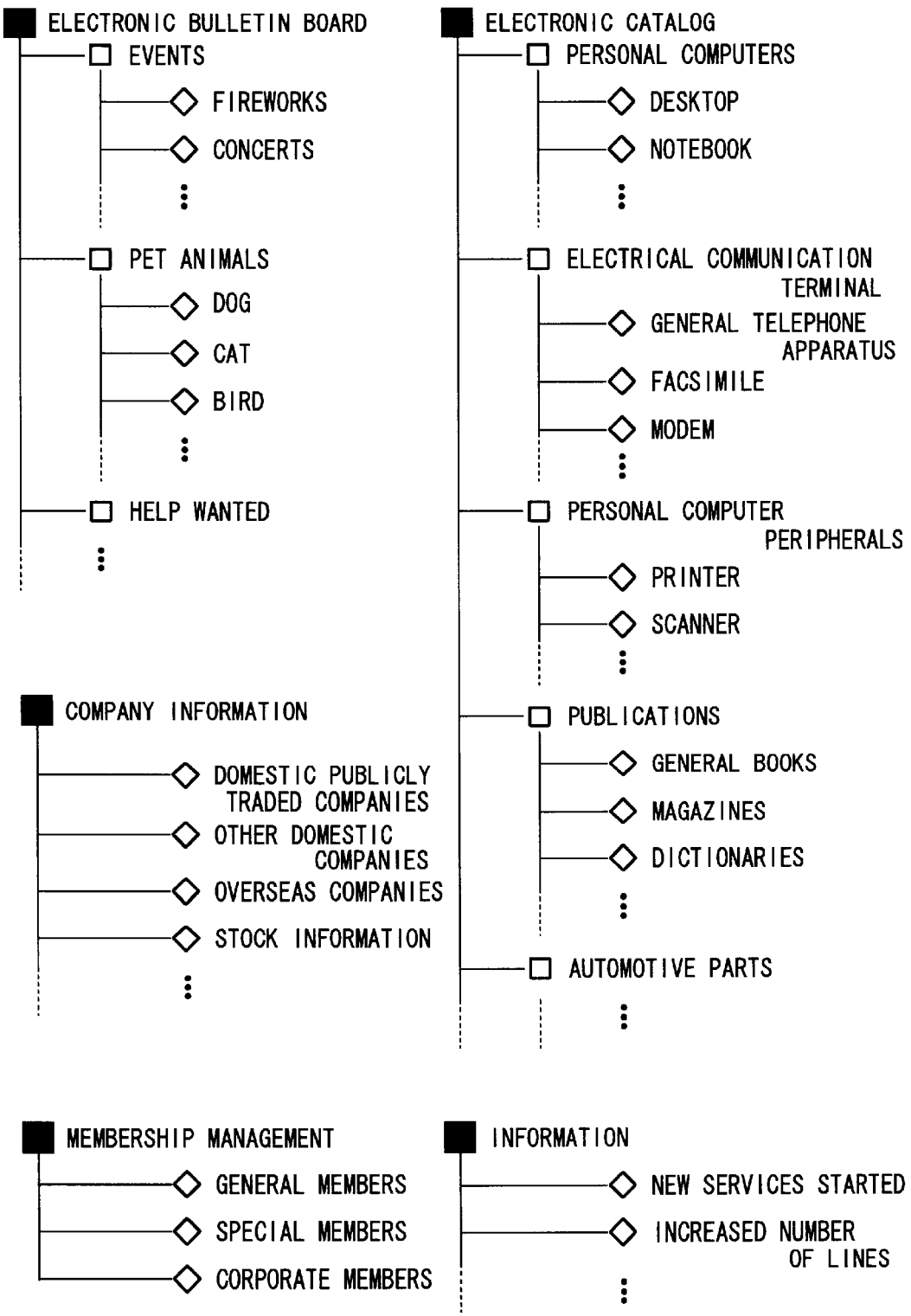
FIG. 2 is a drawing showing an example of the hierarchal structure of categories in the configuration below an area.

In the DBS 1, as shown in FIG. 2, information that is handled is classified into the areas of "■ Electronic Bulletin Board", "■ Electronic Catalog", "■ Company Information", "■ Member Management", and "■ Information".

In the above, the "■ Electronic Bulletin Board" is a bulletin board area into which a client 3 can write various information for public disclosure, the "■ Electronic Catalog" is an area for public disclosure of product information and the like of the client 3 in catalog format, "■ Company Information" is an area for public disclosure of general information and stock information about the company, "■ Member Management" is an area for management of information with regard to members using the system, and "■ Information" is an area for dissemination of notices from the system administrator, these areas being only examples, it being possible to provide various areas as necessary.

As data registration into the DBS 1 proceeds, various hierarchal category levels are formed below each of the above-noted areas, this condition being shown by examples given in FIG. 2.

In this drawing, the upper-order categories, marked by □, are provided at the discretion of the administrator of the DBS 1, or in response to a request from a client 3 or in response to the condition of registration of data and the like, and categories marked with ◇ are categories that can be established by the administrator of the DBS 1, but which are mainly selected and set freely by a client 3 at the time of data registration, and at this category level, the DP are also being set and registered into the DPT 21.

Although in FIG. 2 only category levels down to the levels marked by ◇ are shown, it is possible to establish category levels below these as necessary.

On the other hand, in the DBS 1, the above-noted hierarchal structure is managed by the CLMT 19 having a data cell structure as shown in FIG. 3.

In this case, the CATG_KJ (category name) column regards each area of FIG. 2 as a category level, each lower-order category name thereunder being stored on a separate line. The CATG_NO (category number) column stores numbers which correspond to each of the above-noted category names as category identification numbers on the same line, a new number being sequentially assigned to categories each time a category name is added.

The ROOT_CATG_NO (root category number) column is assigned numbers for the uppermost-order categories, such as 1/2/3/4/5 for the areas ■ Electronic Bulletin Board/■ Electronic Catalog/■ Company Information/■ Member Management/■ Information, which indicate to which area category names there below belong. The PARENT_CATG_NO (parent category number) column indicates the category number of the category name of higher order. For each of the above-noted areas, since there is no higher order category, the PARENT_CATG_NO is 0.

By referencing the CLMT 19, therefore, it is possible to verify the hierarchal position of areas and each category name.

2. Data Registration Procedure

In the DBS 1, main data registration into the MDT 22 is done, with the premise being that the DP are set and registered into the DPT 21.

Although whether or not the client 3 performs this registration procedure continuously is arbitrary, because the data registration processing is performed independently in this system, each registration procedure will be described separately herein.

(1) DP Setting/Registration Procedure

Figure 4:
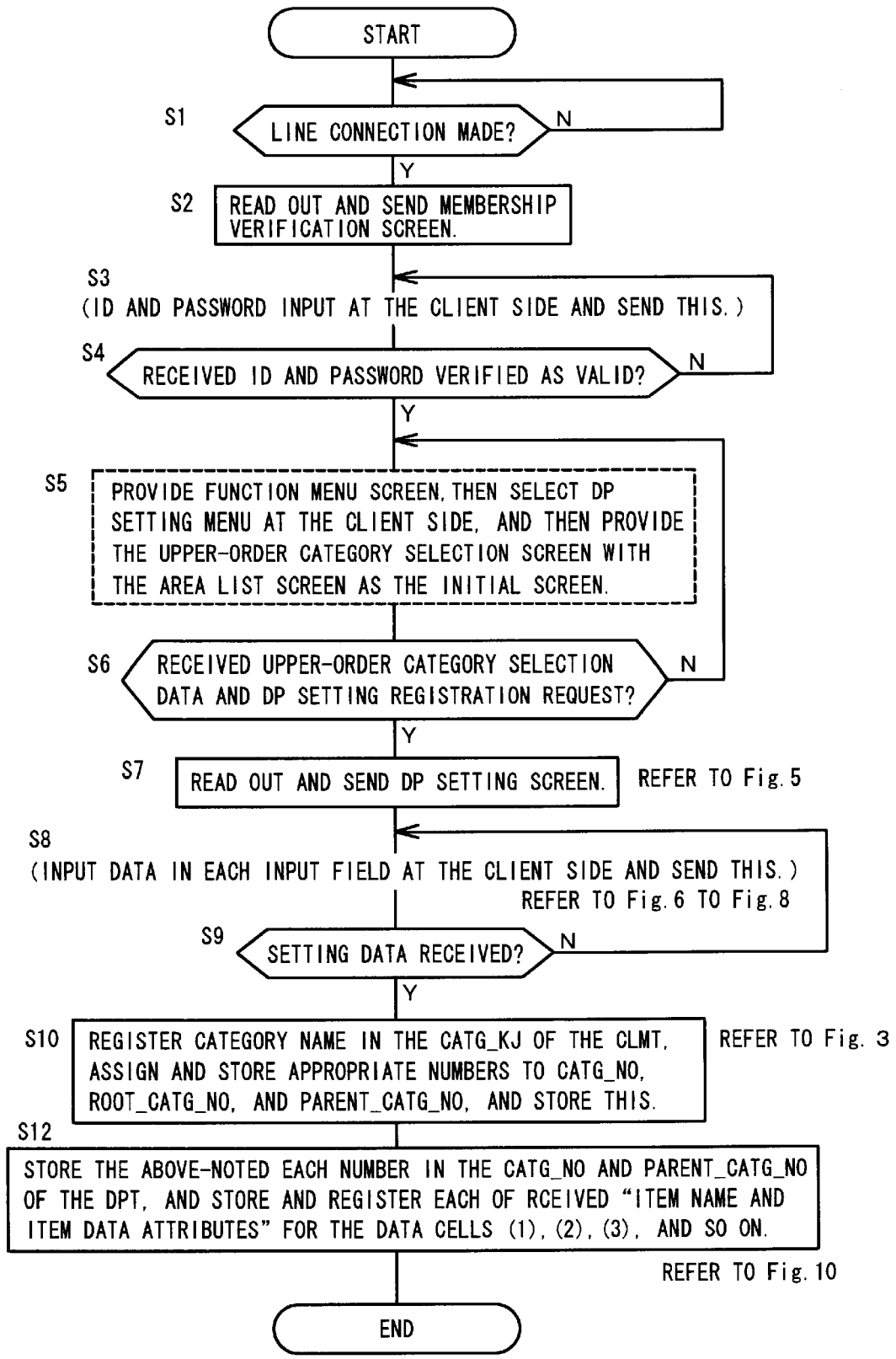
FIG. 4 is a flowchart showing the setting registration procedure for data properties (DP).

This registration procedure is shown in the flowchart of FIG. 4.

First, when the client 3 makes connection to the DBS 1 via the Internet 2, the DBMS 10 reads the member verification screen data (18) from the HDD 13, and sends this to the client 3, which inputs the ID and password into the prescribed locations thereof and sends this to the DBS 1 (S1 to S3).

At the DBS 1, when the ID and password are verified as being proper for the member, the system is opened up to the client 3, and function menu screen data (18) is read out from the HDD 13 and sent to the client 3 (S4 and S5).

The function menu screen provided to the client 3 is a screen for the purpose of selecting various functions, such as "DP Setting" and "Main Data Registration" of the DBS 1.

If "DP Setting" menu is selected from this screen, an area list screen (with guides to lower-order levels) is provided as the initial screen, from which the client 3 performs instruction operations, in response to which a selection screen for upper-order categories belonging to lower-order levels of the areas is provided (S5).

There screens are formatted as a list display or tree display, either of these being generated by the DBMS 10, based on management data of the CLMT 19.

If the client 3 selects "DP Setting" at the upper-order category, at the DBS 1 the DBMS 10 reads out DP setting screen data 20 from the HDD 13, and sends this to the client 3 (S6 and S7).

At this point, the screen provided and displayed to the client 3 based on the DP setting screen data 20 has the configuration shown in FIG. 5.

As shown in the drawing, this screen has a field for inputting the category name, which is an abstract concept of the registered information, input fields for each item name representing an attribute and/or a function of that category, input fields for the data type for representation of the substantial contents associated with each item name, and an additional comment field.

Although it is not shown in this drawing, the region surrounded by a broken line is used to display input guidance.

Other fields provided are the display sequence as already input initial values, which can be overwritten, fields for the input style and display style, into which are input the style codes given later at the DBS 1, and a data registration field, which is used to indicate whether or not it is desired to register main data registration is to be performed below the category name.

When the above-noted DP setting screen (FIG. 5) is displayed at the client 3, input is made of the desired category name for registration (category belonging to the upper-order category selected at step S5), each item name (including a change in the display sequence, if necessary), and the data type for display of the substantial contents for each item name (S8).

In this case, in making the input of the data type, buttons provided to the right of each input field are clicked, at which point a pull-down menu such as shown in FIG. 9(A) is displayed, from which selection can be made.

When each item name and data type are input and the "Next" button at the bottom is clicked, input fields for the maximum character lengths, units, ranges, search specification (whether or not the data is to be searched on), and a list display (whether or not to make a list display) are individually displayed on the display area of the above-noted input guidance.

For example, if "Pet Animals" is selected as the upper-order category, and the category name is "Dog," as shown in FIG. 6, the assumption is made that input is made of the item names Breed, Age, Weight, Height, Male/female, tricks, Favorite Food, Pedigree, Owner, and Photography, when data types of character/value/value/value/character/character/character/character/character/image are set so as to represent the substantial contents of these item names, an input field enabling display of a pull-down menu such as shown in FIG. 9(B) is displayed in the maximum character length field for character type items. For value type items, a length of no greater than 64 single-byte characters is assumed, and, although the maximum character length field is blanked, in its place input fields for units and range specification are displayed. In the case of an image item, because there is no need for a maximum character length, units, or a range specification definition, all these are blank. For the range specification, a pull-down menu such as shown in FIG. 9(C) is provided.

The prescribed input is made from the client side 3 into the input fields for the maximum character length, units, range specification, searching specification, and list display, and if the character length is specified as unlimited, an input field is displayed by the size of the estimated number of rows and columns, and the input is done to the field.

The screen shown in FIG. 6 shows the condition in which the input to the DP Setting screen for the above-noted category name "Dog" has been completed.

On the other hand, the two pages of screens shown in FIG. 7 and FIG. 8 show the conditions in which input has been completed in the DP Setting screens when "Electrical Communication Terminal" is selected as the upper-order category and "General Telephone Apparatus" is selected as the category name, in which, although there are more item names than when "Dogs" is selected as the category name, input is made by following the same type of procedure.

In this case, the item name is selected with the data type of the approval year, month, and day being the date, an input field of a pull-down menu such as shown in FIG. 9(D) being displayed in the column for the maximum character length, based on this selection, and an input field of a pull-down menu such as shown in FIG. 9(C) being displayed in the range specification column, prescribed input being made into these fields.

In the DP Setting screens (FIG. 6 to FIG. 8) for the various above-noted category names, Plug-in/audio/E-mail/URL Link/download/password/Intersystem Link is not selected within the data type indicated in FIG. 9(A).

"Plugin" is provided for the case of movie data, "Audio" is provided for the case of audio data, "E-mail" is provided for E-mail data, "URL Link" is provided for data on a web page on the Internet 2, "Download" is provided for downloading of data from the Internet 2 or a local area network (LAN), "Password" is provided for a password used when viewing the substantial registered contents, and "Intersystem Link" is provided for capturing of data from another system or application, and while these are similar to the foregoing described forms of screens, when substantial main data is to be registered later, a dedicated wizard or special notation format is required (with the format **** for the password).

When the DP Setting screen input is completed as described above from the client 3, the contents update button is clicked to send the input to the DBS 1 (S8).

On the other hand, at the DBMS 10, when the setting data is received from the client 3, the category name thereof is registered in the CATG_KJ of the CLMT 19, a serial number is applied as the CATG_NO, and appropriate numbers are given to and stored into the ROOT_CATG_NO and the PARENT_CATG_NO (S10).

For example, if as shown in the above-noted example (DP settings of FIG. 6), "Dog" is selected as the category name, and this is the first registration operation for this category name, as shown in FIG. 3 "Dogs" is registered as a CATG_KJ, "16" is stored as the serial number into CATG_NO, "1" is stored into the ROOT_CATG_NO since this corresponds to registration into the "■ Electronic Bulletin Board" area, and, because the upper-order category is "Pet Animals," "15", which corresponds to the CATG_NO thereof, it is stored in the PARENT_CATG_NO.

As shown in the DP settings of FIG. 7 and FIG. 8, in the case of the first registration into the category name "General Telephone Apparatus," "18" is stored as the serial number into CATG_NO, and, because this corresponds to registration in the area "■ Electronic Catalog," "2" is stored into the ROOT_CATG_NO, and, because the upper-order category is "Electrical Communication Terminal," "11", which corresponds to that CATG_NO, is stored into the PARENT_CATG_NO.

In the case in which the same category name already exists in the CATG_KJ of the CLMT 19, if there is a request for DP setting registration, when this is done a CATG_NO is given, at which point the registered category name is assigned and registered as "Dogs 1" so as to distinguish this from the previous "Dogs" (refer to CATG_NO 21 in FIG. 3).

Next, the DBMS 10 causes the received DP setting data to be stored and registered into the DPT 21 (S12).

Figure 10:
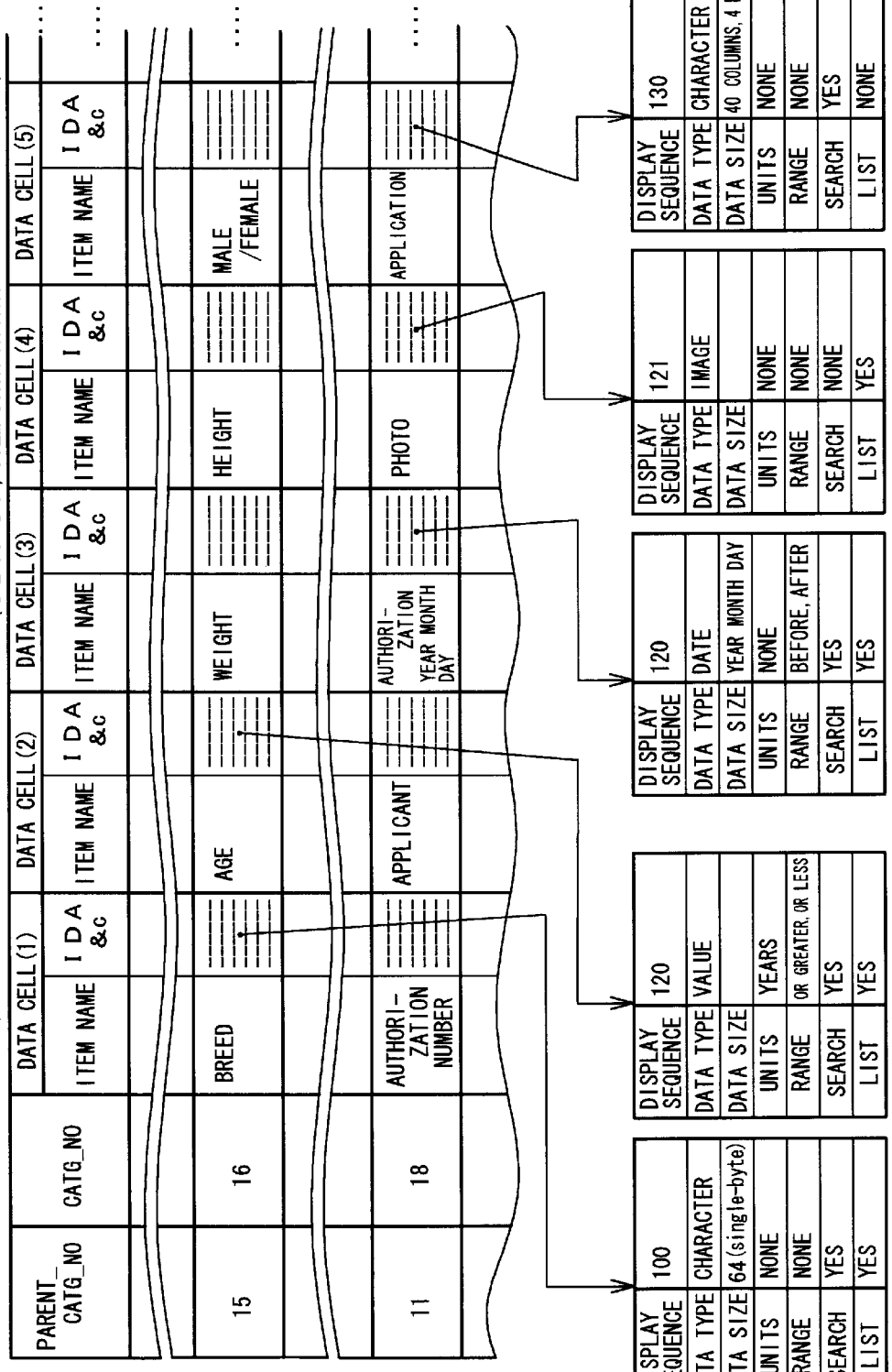
FIG. 10 is a drawing showing a schematic representation of the configuration of a data property table (DPT).

The method of registration into the DPT 21 is shown in FIG. 10.

First, the DPT 21 is a table formed by data cells, the DBMS 10 assigning the first column for storage of the PARENT_CATG_NO, assigning the second column for storage of the CATG_NO, and assigning the third and subsequent columns for storage of the item names, display sequence, data type, data size, units, range specification, searching specification, and list display of the above-noted DP setting data.

In this embodiment, the numbers starting at (1) and incrementing upward are assigned to the data cells from the third column in the DPT 21.

In the description to follow, the phrase "item data attributes and the like" will be used to refer collectively to the "display sequence, data type, data size, units, range specification, searching specification, and list display," and the term "item data attributes" will be used to refer to only the "data type, data size, units, and range specification" thereof.

The DBMS 10, based on the above-noted assignment method, stores "item name and item data attributes and the like" of the received DP setting data into each data cell in units of rows along with the numbers of the PARENT_CATG_NO and CATG_NO previously stored into the CLMT 19 (S12).

As a result of the above, if the received setting data was a category name of "Dogs" and a category name of "General Telephone Apparatus," the registration is actually made in the form shown in FIG. 10, this registration format being the same for all other categories as well, so that the DP setting data for one category is always registered into one line of the DPT 21.

The data registered into each line of the DPT 21 is thus associated by the PARENT_CATG_NO and the CATG_

NO with the area, upper-order category, and category name registered in the CATG_KJ of the CLMT 19.

There are cases in which a category name for which registration is requested already exists in the CLMT 19, and the DP setting data thereof is registered in the DPT 21, so that the request is made for registration of one and the same category name.

In such cases, separate individual storage is performed at the DBS 1, regardless of whether or not the "item names and item data attributes and the like" are the same, but because the category names are the same, storage is done in CATG_KJ of the CLMT 19 after adding an identifier such as "1" R "2" to the category names. For example, the existence in the CLMT 19 of FIG. 3 of both CATG_KJ: "Dog" with a CATG_NO of "16" and CATG_KJ: "Dog 1" with a CATG_NO of "21," and a similar example for CATG_KJ: "General Books" is the result of the above-noted processing.

In these cases, if the "item names and item data attributes and the like" are all the same or have a common part, this information is stored in the added information field of the CLMT 19 (column after CATG_KJ in FIG. 3), and provided for use in a later list display or search procedure.

It is also possible, in contrast to the above-noted processing performed in this DBS 1, to permit only one registration in a single category name.

(2) Main Data Registration Procedure

Figure 11:
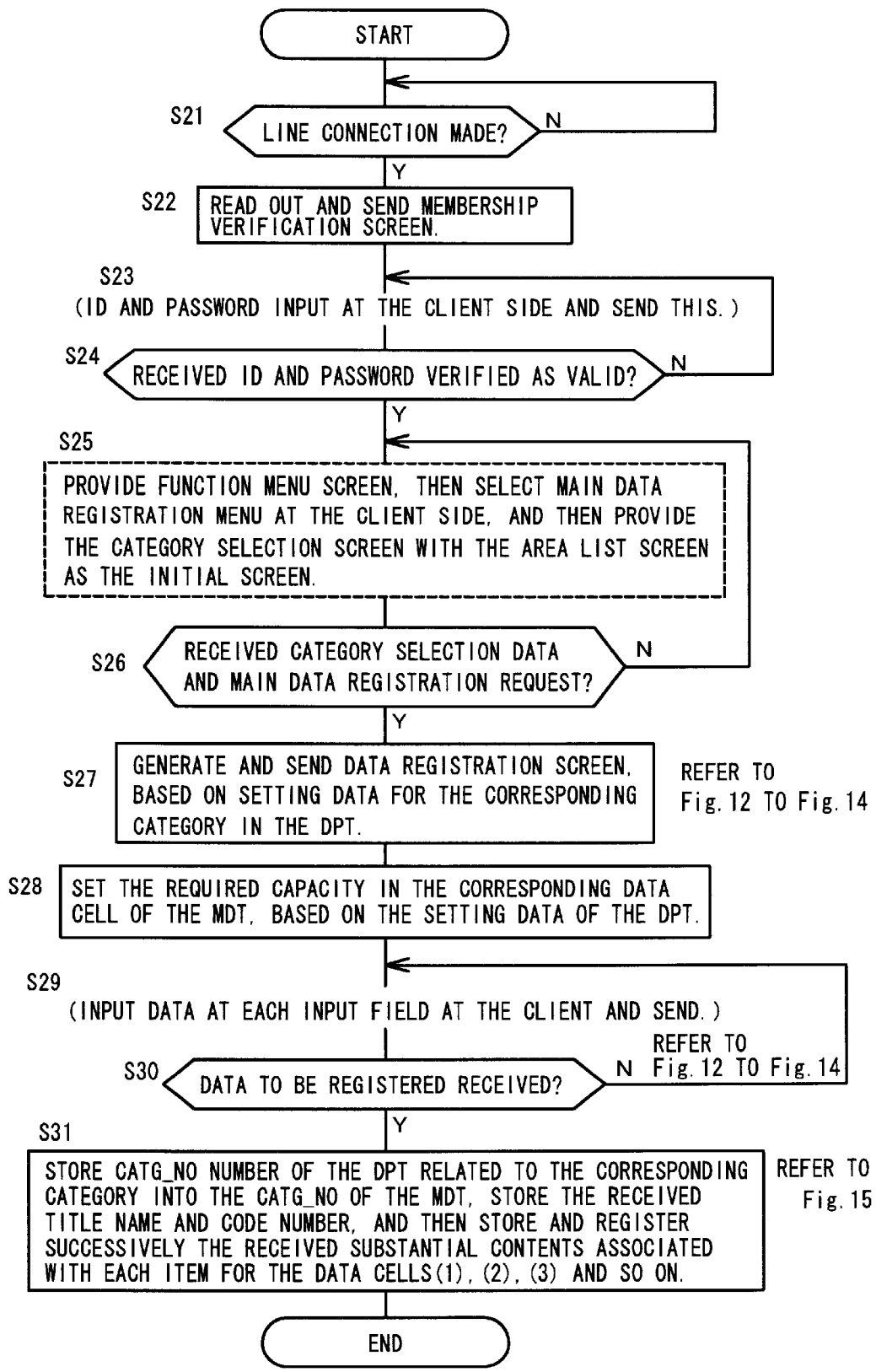
FIG. 11 is a flowchart showing the registration procedure for main data.

The main data registration procedure is shown in the flowchart of FIG. 11.

The data registered into the DPT 21 is not the substantial data registered, but a virtualization thereof, in the form of the "category name," the "item name of associated attributes and/or functions," and "attributes possessed by data representing the substantial contents associated with the item name."

However, because this is virtualized data, this function is extremely rational in registering substantial contents in associated with main data in this registration procedure.

First, in the registration of main data as well, when the client 3 makes connection to the DBS 1 via the Internet 2, a function menu screen (18) is provided, by following the same type of procedure as in the above-noted case of "DP Setting," except that in this case the client 3 selects the "Main Data Registration" from this menu (S21 to S25).

Then, in this case as well, the DBS 1 provides an area list display screen as an initial screen, based on the above-noted function menu selection, whereupon the client 3 performs an instruction operation from this screen, so as to transition from area, to upper-order categories, to categories, in sequence, moving down in the hierarchy of levels of list or tree displays, until ultimately the client 3 is presented with a category selection screen (S25).

That is, the client 3 successively makes specifications of an area and an upper-order category associated with the current information to be made, selecting the desired category from registered categories, following the above-noted DP setting registration procedure.

Upon receiving the category selection data and the main data registration request at the DBS1, the DBMS 10 generates registration screen data for the substantial contents associated with the selected category, and sends this to the client 3 (S26 and S27).

If, for example, the category name is "Dog," this registration screen is as shown in FIG. 12, and if the category name is "General Telephone Apparatus," the registration screen is as shown in FIG. 13 and FIG. 14, with input field of the sent registration screen except for the code number left blank.

Specifically, the registration screen, as shown in the drawings, is formed by a title indicating that the screen is an input screen for registered data of a particular category name, a code number display field, an input field for a title name of the registered information, and input fields for item names and the substantial contents associated with each item.

In this case, the sent registration screen data is obtained by the DBMS 10 searching for the CLMT 19 (FIG. 3) CATG_KJ using the selected category name as a key, searching for the DPT 21 (FIG. 10) CATG_NO using the CATG_NO corresponding to the category name as a key, and generating a display method based on an "item name and item data attributes" stored in each data cell in the row direction and having one and the same number in the DPT 21.

As is clear by referring to FIG. 6, FIG. 10, and FIG. 12 in the case of the category name "Dog" and by referring to FIG. 7, FIG. 8, FIG. 10, FIG. 13, and FIG. 14 in the case of the category name "General Telephone Apparatus," the input fields for substantial contents associated with each item of the registration screen are formed by sizes, units, and input methods and the like corresponding to the item data attributes of the DPT 21, thereby providing an easy-to-understand screen for use when the client 3 makes input of substantial contents to be registered.

The DBMS 10 performs preparation for the purpose of storing substantial contents of registered information received later into the MDT 22 (S28).

That is, in order to secure in advance, the capacity of data cells in the row-direction to be registered with substantial contents which will be received later, the capacities of the data cells that correspond to the MDT 22 are successively set, based on the data type and maximum character length of each item associated with the said category name of the DPT 21.

And at the client 3, the desired substantial contents associated with title name and each item name, as shown in FIG. 12 (for the case of the category name "Dog"), or FIG. 13 and FIG. 14 (for the case of the category name "General Telephone Apparatus"), is input via the input fields of the above-noted registration screen, and the "Register" button at the bottom is clicked to send the input data to the DBS 1 (S29).

If the item name is Photo and the data type is image, however, an image registration button appears to the side of the input field of the registration screen and, by clicking this button, a wizard that gives instructions for the capture of image data is launched, the image data being captured as registered data by following the instructions thereof.

The same is true in the cases in which the data type is Plugin, Audio, Download, or Intersystem Link, capture of data in each case being executed based on a wizard for each data type.

On the other hand, at the DBS 1, which has received the above-noted registered data, the DBMS 10 stores and registers the CATG_NO, title name, code number, and substantial contents of each item associated with the category name into each data cell of the MDT 22 in units of rows (S30 and S31).

The method of data registration into the MDT 22 is shown in FIG. 15.

First, the MDT 22 is a table formed by data cells, the first column of which is assigned to the row number, the second column of which is assigned for storage of CATG_NO, the third column of which is assigned for storage of a title name, the fourth column of which is assigned for storage of the code number, and the fifth and subsequent columns of which are assigned for storage of substantial contents associated with each item name. In this embodiment, the numbers starting at (1) and incrementing upward are assigned to the data cells from the fifth column.

The DBMS 10 successively stores substantial contents associated with each item name into data cells of the MDT 22 having the same number as the data cell numbers of the DPT 21.

Specifically, in the above-noted case of registered data in which the category name is "Dog" and the title name is "Amber," as shown on line No. 148 of FIG. 15, the category number of "Dog," which is "16," is stored beforehand in the data cells of the CATG_NO column, "Amber" is stored in the data cell of the title name column, and the substantial contents associated with Breed, Age, Weight, Height, and so forth are stored in data cells of ascending data cell numbers, and each data being stored in the same manner on row No. 287 for the case of the category name "General Telephone Apparatus" and the title name "T-3360 Telephone Apparatus."

The capacity of each data cell is set beforehand at step S28 of the above-noted procedure to a capacity into which each of the substantial contents can be stored.

For example, however, in line No. 287 associated with the title name "T-3360 Telephone Apparatus" of FIG. 15, the data of the "IMAGE FILE No. 43" is stored into the data cell number (4).

This occurs because, as shown in the DP setting screen (FIG. 7), the configuration of the DPT 21 (FIG. 10), and the registration screen (FIG. 13), the data cell number (4) of the above-noted line No. 287 is basically for storage of a photograph with the data type of image, and when the "Image Registration" button is clicked in the registration screen at the client 3, the image registration wizard that is launched is followed in storing the image data, the DBMS 10 causing this image file to be stored on the HDD 14a of the file server 14, and the address on the file server 14, being "IMAGE FILE No. 43," is stored into the above-noted data cell of the MDT 22.

That is, in the DBS 1 of this embodiment, to avoid a great unbalance in the amount of data stored in data cells of the MDT 22, in the cases in which the data type is Image, Plug-in, Sound, or Download, these data are stored as files at the file server 14, with only this file number registered into the data cell of the MDT 22.

By doing this, the DBS 1 of this embodiment, as shown in FIG. 15, causes storage into the MDT 22 of the registered information associated with various categories other than "Dog" and "General Telephone Apparatus," the substantial contents stored in the each data cell of the MDT 22 being associated with item data attributes stored in data cells of the DPT 21 having the same data cell numbers.

As shown in FIG. 15, the DBS 1 of this embodiment is characterized by the fact that it stores each substantial contents to be registered for all categories in a single table, the MDT 22, and by the fact that each of the substantial contents of the MDT 22 is virtualized in the form of "item names and item data attributes and the like" by the DPT 21.

The DBS 1 of this embodiment, by virtue of the above-noted characteristics, features not only an extremely simplified table structure, but also an extremely simple program for performing various procedures such as data viewing (searching and output), data modification (updating and deletion), and changing items associated with a category, which will be described later.

3. Data Viewing (Searching and Output) Procedure

First, in the DBS 1 of this embodiment, the appropriate selection is made at the client 3 at the area list display and various other screens provided from the DBS 1, resulting in receipt of an upper-order category list such as shown in FIG. 16. However, for the viewing of this data, which is by its very nature generally is publicly disclosed, knowledge of whether or not the client 3 is a member is not required, and the transmission of the membership verification screen or the input procedure for the ID and password is not required.

Display of the upper-order category list, for each category name in the CLMT 19, based on the upper-order category names or information areas given by the administrator of the DBS 1, shows whether lower-order classes exist, a field for selecting whether or not lower-order list data is to be viewed, and general descriptions of the registered data included in each of the upper-order categories.

For example, "View List Data" is selected for an upper-order category name "Pet Animals" on this screen, a list display screen in tree format such as shown in FIG. 17 is provided.

These display screens are formed by a prescribed display method, by the DBMS 10 referencing the CLMT 19 and the DPT 21.

The following description starts from the search procedure in the case in which "View a list of Dogs data" is selected at the tree display screen of FIG. 17.

Figure 18:
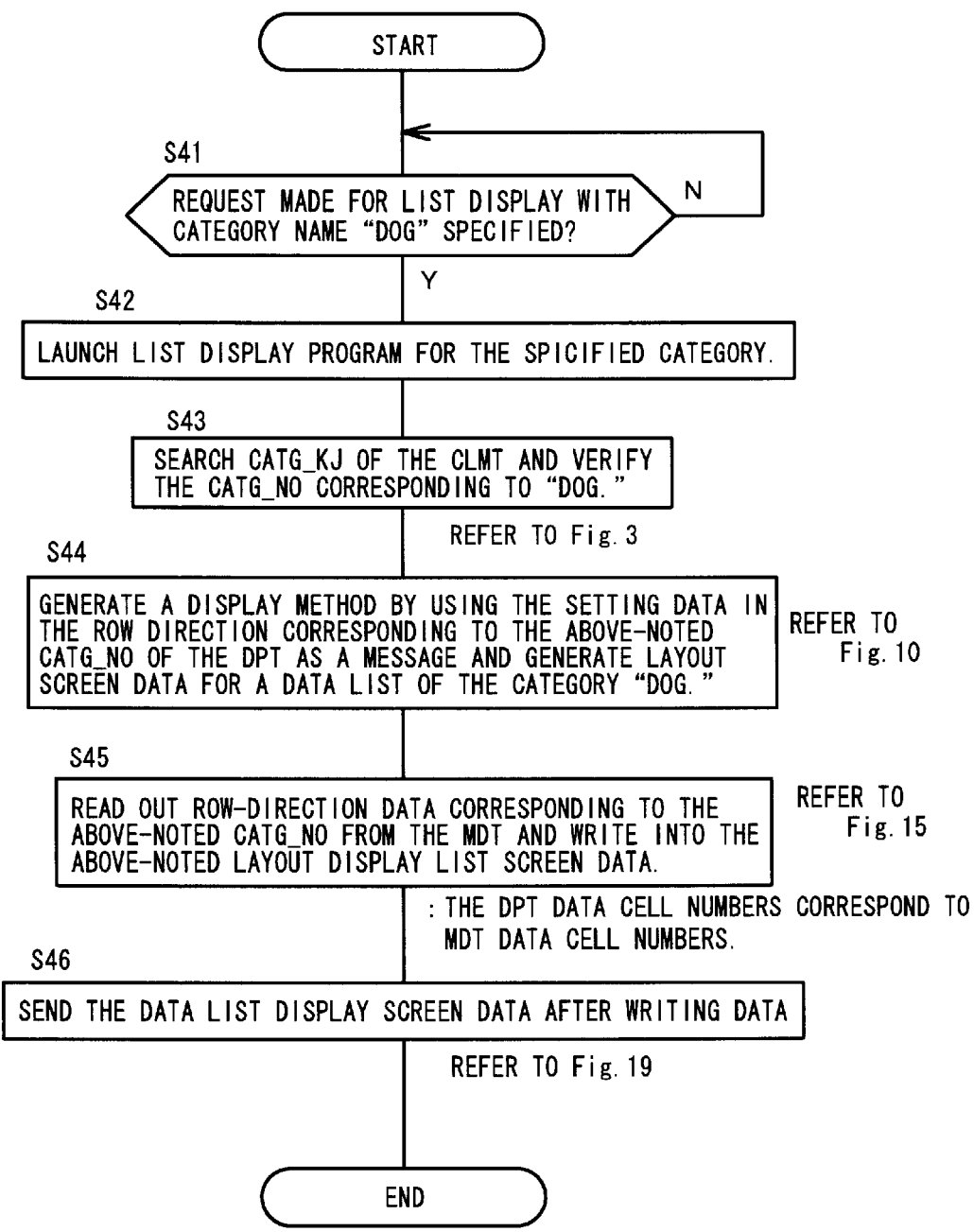
FIG. 18 is a flowchart showing the search procedure with respect to a request for a list display of the category "Dog."

The search procedure is shown in the flowchart of FIG. 18.

When the above-noted selection is made, the DBMS 10 launches a data list display program for a specified category (S41 and S42), and searches the CATG_KJ of the CLMT 19 to verify the CATG_NO "16" corresponding to "Dog" (S43).

Next, the DBMS 10 searches the second column (CATG_NO column) of the DPT 21 (FIG. 10) and reads out the setting data in the row direction corresponding to the above-noted number "16," immediately generating a display method as a message of this, and generating layout data of the data list of the category "Dog" (S44).

Next, the DBMS 10 searches the second column (CATG_NO column) of the MDT 22 (FIG. 15), reads out the registered data in row direction corresponding to the above-noted number "16," and writes the readout data into various prescribed locations of the layout data just generated, so as to generate the display screen data (S45).

In this case, as is made clear by mutually referencing the row direction setting data, which in the CATG_NO "16" in the DPT 21 of FIG. 10 and the registered data in the row directions at which the CATG_NO is "16" in the MDT 22 of FIG. 15, there is a correspondence set up by the CATG_NO "16" with regard to the category name, and a correspondence set up between each of the "item names and item data attributes and the like" in the DPT 21 and the substantial contents associated with each item name at the MDT 22, by numbers of the data cells, thereby greatly simplifying the program used to generate the above-noted display screen data.

Then the generated display screen data is sent to the client 3, at which it is displayed as data list of the category "Dog" such as shown in FIG. 19 (S46).

In the list display of FIG. 19, for the item examples "Tricks," "Favorite Food," and "Photo," the "New Window" link is provided because the large amount of data for these items in the DPT 21 would make it impossible to establish a sufficient display area in the case of the list display.

While the foregoing description is limited to the category name of "Dog," as noted in the discussion of DP Setting/Registration Procedure, when a request is made for registration of an existing category name, an identifier such as 1 or 2 is appended to the latter category names before storage into the CATG_KJ of the CLMT 19, and when all the "item names and item data attributes and the like" are the same or when there are common parts, that information is stored in an additional information field. Naturally, main data is also stored with regard to a category name having such an identifier appended thereto.

In this DBS 1, in the case in which a data list display has been made of the category "Dog," in principle the categories "Dog" and "Dog 1," which have different category names, will be displayed on separate list displays, but when the such added information as noted above is stored, it is also possible to include part or all of the registered data for "Dog 1" within the data list for the category "Dog" by using that information.

Next, in the data list of the above-noted category "Dog," if an individual underlined title name or each New Window part is clicked, it is possible to provide and display the corresponding information.

In particular, if a request is made to view by clicking a separate title name part, a search is made for the registered items for that title name, and a response screen can be displayed that includes all substantial contents.

Figure 20:
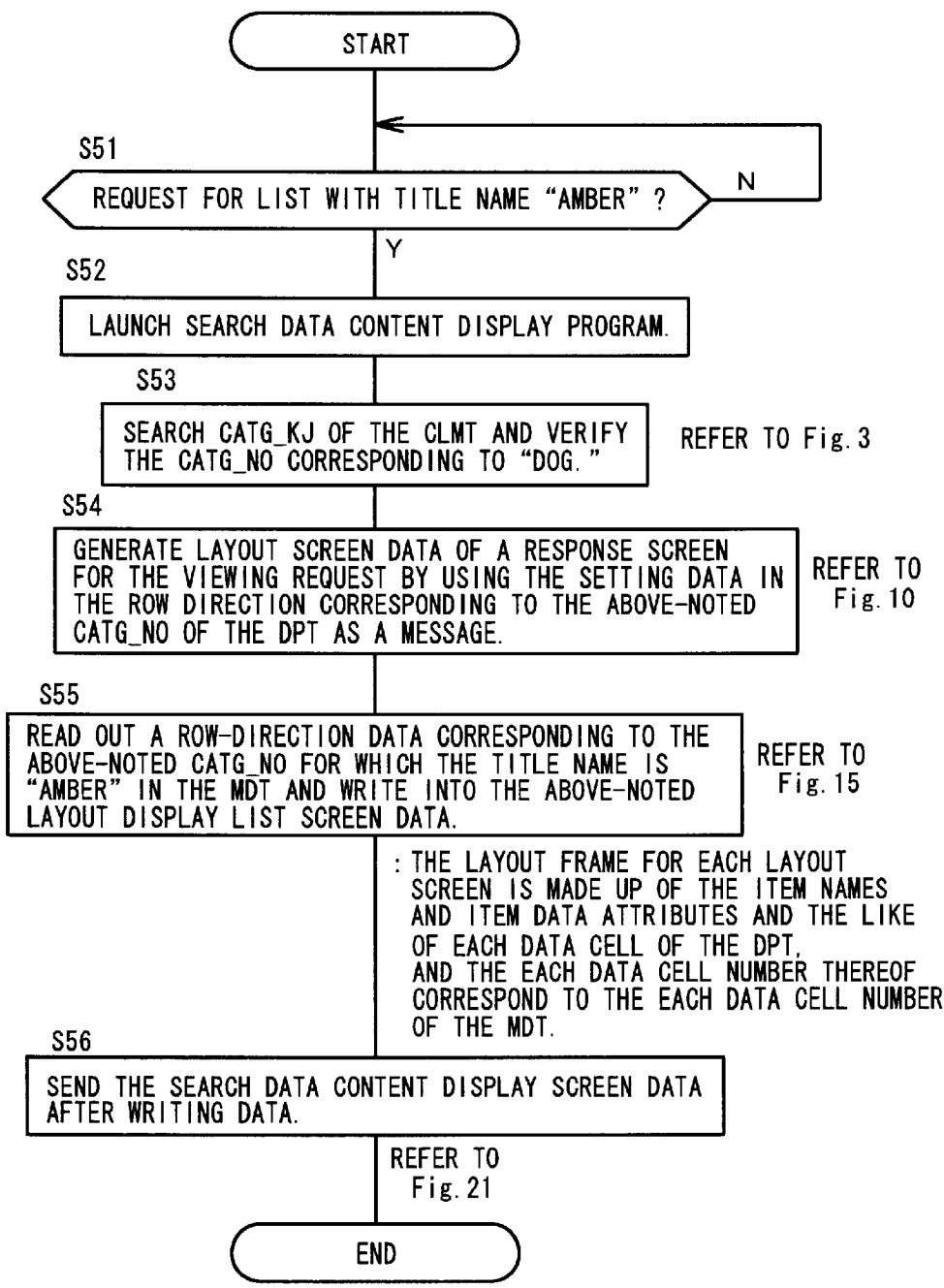
FIG. 20 is a flowchart showing the search procedure with respect to a request for a viewing in which the title name "Amber" was specified.

Given the above, the procedure up to the point of obtaining the response screen for the case in which a request is made to view the title name "Amber" from the data list for the category "Dog" is described below, with reference to the flowchart of FIG. 20.

First, when the title name "Amber" is clicked from the screen shown in FIG. 19, the DBMS 10 launches the content displaying program for searched data (S51 and S52).

Then, based on this program, the DBMS 10, similar to the case described above, searches the CATG_KJ of the CLMT 19 (FIG. 3) to verifies CATG_NO "16" corresponding to "Dog" (S53).

And, the DBMS 10 searches the CATG_NO of the DPT 21 (FIG. 10), and row-direction setting data corresponding to CATG_NO "16" is read out, immediately generating a display method as a message of this, generating layout data for the response screen associated with the category "Dog" (S54).

In this case, the layout data is generated based on each item data attributes and the like stored in the data cells (1) to (11) associated with the category name "Dog" of the DPT 21 (FIG. 10), the display sequence of the substantial contents associated with each item name and the method of display thereof are given as data by each of the item data attributes and the like, therefore, the above-noted program only automatically designs the layout by using those data.

Next, the DBMS 10 searches the CATG_NO column and the title name column of the MDT 22 (FIG. 15), reads out row-direction data for a row in which the CAT_NO is "16" with the title name "Amber," and writes this into each prescribed location of the layout screen data just generated, thereby generating the response screen data (S55).

The DBMS 10 sends this response screen data to the client 3, at which it is presented as a response screen such as shown in FIG. 21, enabling verification of the substantial contents of the "dog named Amber" that was requested (S56).

The above-noted layout design program adaptively generates a layout method, taking the item data attributes and the like of each item name as messages, and is not a program that is designed and prepared beforehand for individual category names.

With regard also to the writing of the substantial contents associated with each item name into the layout data, similar to the case of causing a display of the above-noted data list, because each of the "item names and item data attributes and the like" at the DPT 21 (FIG. 10) and the substantial contents associated with each of the item names of the MDT 22 (FIG. 15) correspond by means of data cell numbers, it is possible to execute this with a very simple program description.

Therefore, while a program for generating a response screen based on a viewing request is given as a single general-purpose program not specific to any category name, it automatically generates an adaptive display method with respect to each different category name.

Figure 22:
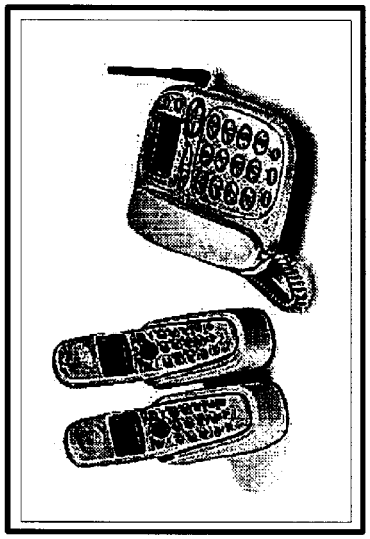
FIG. 22 is a drawing showing the retrieved content screen (search results screen) from a search on the category name "Communication Terminal" and the title name "T-3360 Telephone Apparatus."

Although not shown in the drawings, if there is a viewing request that specifies the title name "T-3360 Telephone Apparatus" as in the data list for the category name "General Telephone Apparatus," a procedure similar to the one noted above is used to adaptively generate a display method for the category name "General Telephone Apparatus," a response screen such as shown in FIG. 22 being provided to the client 3.

Next, a search (hereinafter referred to as a conditional search) in which a category name and another condition are specified, of the type often used in general DBS, is described below.

Figure 23:
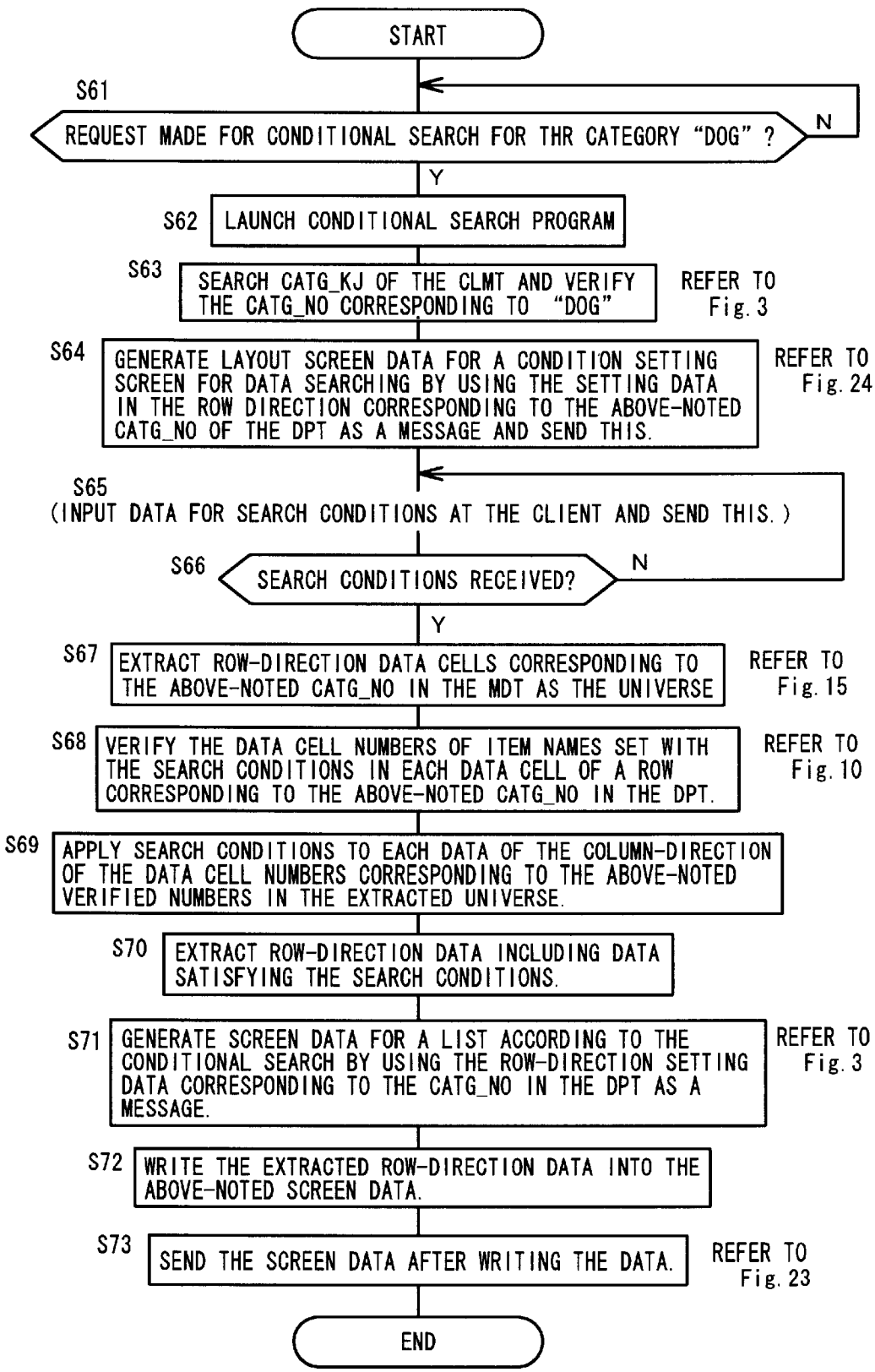
FIG. 23 is a flowchart showing the search procedure with respect to a conditional search request for the category name "Dog."

With the category name "Dog" specified, this conditional search process is described below, with reference being made to the flowchart of FIG. 23.

First, although not shown in the drawing, in this embodiment there is a screen that permits specification of a conditional search as an option, and, when a conditional search is specified at the client 3 from this screen, the DBMS 10 launches a program for this purpose (S61 and S62).

Then, based on this program, the DBMS 10, similar to the above-noted case, searches the CATG_KJ column of the CLMT 19 (FIG. 3), and verifies the CATG_NO "16" corresponding to "Dog" (S63).

A display method using the row-direction setting data associated with the CATG_NO "16" of the DPT 21 (FIG. 10) as a message generates condition setting screen data such as shown in FIG. 24, this being sent to the client 3 (S64).

Upon receiving the above-noted screen, the client 3 can specify various conditions in the input fields of the screen of FIG. 24, and the example shown is that in which the "Age" conditions of at least 2 years old and no greater than 4 years old and the "Weight" conditions of at least 15 kg and no greater than 35 kg are specified.

When the "Start Search" button is clicked as an instruction, this searching condition is sent to the DBS 1 (S65).

Upon receiving the above-noted searching condition data at the DBS 1, the DBMS 10 first extracts as the universe of the row-direction data cells corresponding to the above-noted CATG_NO "16" in the MDT 22 (FIG. 15) (S67).

Item names are stored in the row-direction data cells (1) to (11) having the CATG_NO of "16" in the DPT 21 (FIG. 10), and verification is made of the data cell numbers corresponding to "Age" and "Weight," which are the above-noted searching conditions (S68).

In this case, as is clear from FIG. 10, the corresponding data cell numbers are (2) and (3).

Next, of the row-direction data cells in the above-noted extracted universe, the DBMS 10 applies the above-noted searching conditions to the data stored in column-direction data cells associated with the data cell numbers corresponding to the above-noted verified numbers (2) and (3) (S69).

That is, of the row-direction data cells associated with the category name "Dog" (for which the CATG_NO is "16") in the MDT 22 (FIG. 15), it is only necessary to apply the above-noted searching conditions to the data in data cells having the verified data cell numbers, which in this case means the application of the conditions 2≦Y≦4 and 15≦W≦35 to the values Y and W which exist in the column direction on condition that the CATG_NO is "16" and the data cell numbers are (2) and (3).

And the DBMS 10 extracts the row-direction data including data that satisfies the above-noted searching conditions (S70), and further generates screen data for a list in accordance with the conditional search, with the row-direction setting data associated with the CATG_NO "16" in the DPT 21 (FIG. 10) as a message (S71), writing each row-direction data extracted by the search, after which screen data is sent to the client 3 (S72 and S73).

As a result, a list in accordance with the conditional search such as shown in FIG. 25 is displayed at the client 3, this list data having been obtained by applying the above-noted searching conditions to the substantial contents of the items named "Age" and "Weight" in FIG. 19.

In the list screen of FIG. 25 as well, similar to the case of the list shown in FIG. 19, if an individual underlined title name or "New Window" part is clicked, it is possible to cause a display of the specific content.

4. Data Modification (Updating and Deletion) Procedure

At the client 3, there are cases in which it is desired to modify the substantial contents registered in the MDT 22 (FIG. 15) of the DBS 1. For example, if the specifications of a registered product change, there arises the necessity to overwrite or delete the substantial contents associated with a particular item name.

In such cases, at the DBS 1 of this embodiment, although not shown in the drawings, a screen is sent for the purpose of registration, modification, and deletion of data such as shown in FIG. 12 to FIG. 14, in response to a request from the client 3 specifying a title name or code number.

In the case in which the above-noted necessity has occurred, the client 3 obtains the noted screen and, after performing a desired correction or deletion, clicks the "Page Update" button at the bottom of the screen, so as to sent the changed data to the DBS 1.

When this is done, the DBMS 10 at the DBS 1 side sets the registered data associated with the corresponding title name in the MDT 22 (FIG. 15) as data to be updated, and overwrites this data with the changed data.

In this case, the DBMS 10 permits the updating to be made by verifying the relationship of correspondence between the row-direction data cells of the category name including the title name in the DPT 21, and the row-direction data cells of that category name and the title name in the MDT 22.

In this DBS 1, the above-noted overwriting of registered data is, of course, performed without any effect to other registered data in the system and without the need to change the program.

5. Procedure for Modifying an Item Associated with a Category

If a function or an attribute associated with an actual phenomenon or thing belonging to an already-registered category changes, there could be a desire from the client 3 to modify the item, making it necessary to accommodate this at the DBS 1 side.

In the above-noted section 4, because only a change to substantial data stored in the data cells (1), (2), (3) and so on of the MDT 22 (FIG. 15) was done, arbitrary execution was possible at the client 3. In the case of modifying a category item, however, because this will change the DPT 21 (FIG. 10) and could influence the function of the DBS 1, in principle this is performed by an administrator, using a management personal computer 15 at the DBS 1 side.

That is, because there is a correspondence set up by the data cell number between data cells associated with each item name on the DPT 21 (FIG. 10) side and data cells into which each substantial contents is stored on the MDT 22 (FIG. 15) side, if this correspondence relationship is lost, erroneous input, storage, searching, and output will occur with regard to stored information of the category in which the item was modified.

Forms of modifications to an item that can be envisioned are a. "modifying of an item name", b. "adding of an item", and c. "deleting of an item".

a. With regard to "modification of an item name," because this is merely a change to the item name, which does not affect the system functioning, in the case in which a plurality of clients 3 register data having one category name, although there is a need to check whether or not a skew occurs within the substantial contents associated with the item name at the MDT 22 (FIG. 15), if no problem is discovered, this can be permitted.

In the case in which a skew occurs, the solution is often one of "adding of an item," as described below is section (b).

But, in the case in which a particular client 3 only registers data into one category name, there is no obstacle for the permission of the modifying of the item name.

b. With regard to "adding of an item," an added item name with regard to a category name of the DPT 21 (FIG. 10) and the item data attributes and the like thereof are set and registered, and the substantial contents only has to be registered in the MDT 22 (FIG. 15) by using the setting data of the DPT 21 (FIG. 10) from the newly added registered information.

In this case, although the substantial contents that had been registered before do not exist for the added item, with regard to results of a search it is sufficient to make a blank display for the region corresponding to the substantial contents of that item name.

c. With regard to "deleting of an item," the item name and associated item data attributes and the like of the DPT 21 (FIG. 10) are deleted, along with deletion of the substantial contents of a corresponding column of the MDT 22 (FIG. 15).

In this case, if a particular client 3 only registers data into one category name, and that client 3 desires it, it is possible to permit this. If this is not the case, however, it is necessary to obtain the approval of other clients 3.

Seen from a client 3, the problem is whether or not substantial contents are output in response to a search, and so on, so that if deletion is performed of an item not in the DPT 21 (FIG. 10), but rather of the substantial contents associated with the item in the MDT 22 (FIG. 15), the substantially same effect is provided for this desire. Although the item name will remain in the search results and the like, the substantial contents thereof will be displayed blank.

As described above, in a database system DBS 1 of this embodiment, it is possible to flexibly accommodate changes in an item associated with a category, and even if a change occurs, the change does not influence data of other categories, and what is more important is that there is the great advantage of not having to re-edit the program.

INDUSTRIAL APPLICABILITY

As described above, the present invention can be applied to a database system which comprehensively handles any category or phenomena or things, and has only a very simple table structure, and has the revolutionary feature of being able to use a general-purpose program for each function, without regard to the registered data contents.

By virtue of the above, when compared to RDB, OODB, and ORDB of the past, the present invention achieves a simplification of the table structure, a great reduction in the size of the program, and a great reduction in the cost of implementing the database system. Additionally, it is possible to accommodate change in data or an item with extreme flexibility, eliminating the need to change the program, which, in the database system of the past, required a great deal of time and labor. Hence, this also provides great reduction in the cost of the system operation and maintenance.

In particular, used as an online DBS, the present invention is extremely effective in implementing a system in which data is registered and searched for by a client via a network.

What is claimed is:

1. A database system while managing category names, which are abstract contents of registered information and a hierarchy thereof by a data dictionary file, registers category name, individual title name, and substantial contents of each piece of information being registered,
wherein said system comprises:
a first table and a second table, which are formed by data cells, and
in said first table, category identification information of a category given by said data dictionary file is stored in a data cell of a specific column, and names of items which represent an attribute and/or a function associated with the category and item data attributes representing the substantial contents associated with said items are stored in other cells, each belonging to a row in which said category identification information is stored, and
in said second table, category identification information and a title name are stored in each cell of two specific columns, the substantial contents associated with each item name being stored in other data cells, each belonging to a row in which category identification information and title names are stored, in the same sequence with regard to item names as the row-direction sequence of data cells into which are stored item names and item data attributes in said first table, and
each of a method for input, storage, searching, and output of data associated with registered information being generated based on data stored in said first table, said data base system further comprising:
a first storage means into which is stored a first registration screen onto which are disposed an input field for a category name, which is an abstract concept of handled information, an input field for each item name representing an attribute and/or a function associated with said category, and an input field for defining item data attributes for each item associated with said item names;
a first display means for reading out and displaying a first registration screen of said first storage means;
a first table formed by data cells;
a first registration means, which uses data cells of a specific column of said first table as a storage area for category identification information given by said data dictionary file and assigns each data cell of other columns as a storage area for item names and item data attributes, and which, based on input into said each input field of said first registration screen, registers said category identification information, item names, and item data attributes in units of rows;
a second display means for displaying a second registration screen, which generates a display method based on row-direction data associated with said category name of said first table, and on which is disposed an input field for a title name associated with said registered information, a display field for display of each item name, and an input field for substantial contents associated with each item name;
a second table formed by data cells;
a second registration means, which uses each data cell of two specific columns of said second table as storage areas for category identification information and title names and assigns each data cell of other columns as a storage area for substantial contents associated with said item names, and which, based on input into each input field in said second registration screen, stores category identification information, title name, and substantial contents associated with each item name in units of rows, this storage being performed so that row-direction sequence of said each data cell into which said substantial contents associated with each item name is stored is the same with regard to item names as a row-direction sequence of each data cell in said first table, into which are stored item names and item data attributes;
a data output means, which, in a case in which an inquiry is made with various conditions, based on data registered in said first table associated from said data dictionary file, generates an access method for said second table and an output method for registered data obtained by that access method, these methods causing output of registered data in response to said inquiry.

2. A database system according to claim 1, wherein a data type is provided as a defining item for said item data attributes.

3. A database system according to claim 2, wherein a selection menu is provided for selection of character type, value type, data type, image type, or audio type as the data type defining said item data attributes.

4. A database system according to claim 2, wherein a selection menu is provided that indicates data obtained by a link to another application and/or a link to another system as a data type defining said item data attributes.

5. A database system according to claim 1, wherein a data type and data size are provided as defining items for said item data attributes.

6. A database system according to claim 1, wherein a data type, a data size, a unit, and a range specification are provided as defining items for said item data attributes.

7. A database system according to claim 1, wherein when said second registration means, based on input into said input fields of said second registration screen, stores substantial contents associated with each item name into each data cell of said second table, if the amount of data thereof is large, said data is stored into a second storage means having a large capacity, and only the corresponding address in said second storage means into which is stored said data is stored into the corresponding data cell of said second table.

8. A database system according to claim 1, wherein said first storage means stores said first registration screen provided with input fields in a display sequence corresponding to input fields for input of each item name, said first registration means adds each input display sequence input to said item data attributes corresponding to each item name, stores said data attributes in data cells of said first table, and wherein said data output means generates an output method which sets the display sequence for the substantial contents associated with each item name based on said display sequence associated with said input.

9. A database system according to claim 1, wherein in response to a connection request sent via a network from a client, a circuit connection is made with said client, and in response to a client-side registration request, said first registration screen generated by said first display means is provided to the client-side, and based on transmission of input data to said first registration screen by the client-side, the input data is registered into said first table, and based on said registered data associated with said category identification information of said first table, said second registration screen generated by said second display means is provided to the client-side, and based on transmission of input data to said second registration screen by the client-side, the input data is registered into said second table, and, based on an inquiry from a client-side, various inquiry screens prepared beforehand are provided to the client-side, and in response to inquiry condition, said data output means provide the registered data of said second table to the client-side.

* * * * *